(12) United States Patent
Riley et al.

(10) Patent No.: US 11,636,219 B2
(45) Date of Patent: Apr. 25, 2023

(54) SYSTEM, METHOD, AND APPARATUS FOR ENHANCED WHITELISTING

(71) Applicant: PC Matic, Inc., Sioux City, IA (US)

(72) Inventors: Matthew Quincy Riley, Owosso, MI (US); Robert J. Cheng, Myrtle Beach, SC (US); Robert J. Woodworth, Jr., Charleston, SC (US); Andrew Tuch, Boca Raton, FL (US)

(73) Assignee: PC MATIC, INC., Sioux City, IA (US)

( * ) Notice: Subject to any disclaimer, the term of this patent is extended or adjusted under 35 U.S.C. 154(b) by 248 days.

(21) Appl. No.: 17/246,869

(22) Filed: May 3, 2021

(65) Prior Publication Data
US 2022/0083673 A1 Mar. 17, 2022

Related U.S. Application Data

(63) Continuation-in-part of application No. 17/134,716, filed on Dec. 28, 2020, now Pat. No. 11,507,675.
(Continued)

(51) Int. Cl.
| G06F 21/00 | (2013.01) |
| G06F 21/60 | (2013.01) |
| G06F 21/64 | (2013.01) |
| G06F 21/54 | (2013.01) |
| G06F 21/31 | (2013.01) |

(52) U.S. Cl.
CPC ............ G06F 21/604 (2013.01); G06F 21/31 (2013.01); G06F 21/54 (2013.01); G06F 21/64 (2013.01)

(58) Field of Classification Search
None
See application file for complete search history.

(56) References Cited

U.S. PATENT DOCUMENTS

| 9,117,075 B1 | 8/2015 | Veh |
| 10,853,058 B1 * | 12/2020 | Ouzan ........................ G06F 8/71 |

(Continued)

OTHER PUBLICATIONS

Turaev, Hasan et al. Prevention of Ransomware Execution in Enterprise Environment on Windows OS: Assessment of Application Whitelisting Solutions. 018 1st International Conference on Data Intelligence and Security (ICDIS). https://ieeexplore.ieee.org/stamp/stamp.jsp?tp=&arnumber=8367748 (Year: 2018).*

(Continued)

*Primary Examiner* — Jeremiah L Avery
(74) *Attorney, Agent, or Firm* — D2 Worldwide LLC; Frank Liebenow

(57) ABSTRACT

A computer security system with enhanced whitelisting includes administrative interfaces that accept user inputs to create and modify entries in a whitelist that define which programs are allowed to execute on one or more target computer systems. Upon an attempt to run a program, the entries in the whitelist are used to determine if the program is allowed to run. If an entry in the whitelist indicates that the program is allowed to run, the program is run. Otherwise, at a later time, an administrative interface is used to either block future execution of the program or to create an entry in the whitelist that allows execution of a class of programs or only that the program in the future until revoked. The whitelist is for a single target computer or many computers.

20 Claims, 21 Drawing Sheets

Related U.S. Application Data which is a continuation-in-part of application No. 17/018,427, filed on Sep. 11, 2020, now Pat. No. 11,275,828.

(56) References Cited

U.S. PATENT DOCUMENTS

| | | | |
|---|---|---|---|
| 2003/0172167 A1* | 9/2003 | Judge | H04L 63/0236 709/229 |
| 2012/0030731 A1* | 2/2012 | Bhargava | H04L 63/10 726/3 |
| 2013/0097659 A1* | 4/2013 | Das | G06F 21/51 726/1 |
| 2014/0032691 A1* | 1/2014 | Barton | H04L 51/08 709/206 |
| 2015/0339475 A1* | 11/2015 | Feroz | G06F 21/566 726/23 |
| 2016/0359913 A1* | 12/2016 | Gupta | G06F 16/248 |
| 2016/0373486 A1* | 12/2016 | Kraemer | H04L 63/1441 |
| 2018/0307840 A1* | 10/2018 | David | G06F 21/64 |
| 2019/0325135 A1* | 10/2019 | David | H04L 63/145 |
| 2020/0302058 A1 | 9/2020 | Kenyon | |
| 2020/0394295 A1 | 12/2020 | Ikram | |

OTHER PUBLICATIONS

Powers, Josh et al. Whitelist malware defense for embedded control system devices. 2015 Saudi Arabia Smart Grid (SASG). https://ieeexplore.ieee.org/stamp/stamp.jsp?tp=&arnumber=7449271 (Year: 2015).*

Turaev, Hasan et al. Prevention of Ransomware Execution in Enterprise Environment on Windows OS: Assessment of Application Whitelisting Solutions. 2018 1st International Conference on Data Intelligence and Security (ICDIS). https://ieeexplore.ieee.org/starnp/starnp.jsp?tp=&arnurnber=83677 48 (Year: 2018).

Powers, Josh et al. Whitelist malware defense for embedded control system devices. 2015 Saudi Arabia Smart Grid (SASG). https://ieeexplore.ieee.org/starnp/starnp.jsp?tp=&arnurnber=7 449271 (Year: 2015).

Wibowo, Fahrudin Mukti et al. Collaborative Whitelist Packet Filtering Driven by Smart Contract Forum. 2019 International Seminar on Research of Information Technology and Intelligent Systems (ISRITI). https://ieeexplore.ieee.org/stamp/stamp.jsp?tp=&arnumber-9034654 (Year: 2019).

Rezvani, Mohsen et al. Anomaly-free policy composition in software-defined networks. 2016 IFIP Networking Conference (IFIP Networking) and Workshops. https://ieeexplore.ieee.org/stamp/stamp.jsp?tp=&arnumber=7 497226 (Year: 2016).

\* cited by examiner

| Date | APP Name | Hash Value | Signature | Directory |
|---|---|---|---|---|
| 8/21/16 | winword.exe | <any> | <any> | |
| 8/22/16 | w??word.exe | <any> | <any> | |
| 8/22/16 | <any> | 1125E0 | <any> | |
| 8/22/16 | <any> | <any> | 000233199 | |
| 9/04/17 | <any> | <any> | <any> | C:/PgmFiles/mytrustedapps |

*FIG. 7*

Super Shield Report — 740

| Description — 742 | Date Added — 744 | File Hash — 746 | Level | Type | Action | |
|---|---|---|---|---|---|---|
| Microsoft® Windows® Script Host | 4/1/20 | 0xB0C2FDAC14A9F9AA | PC | OS1 | Remove | — 752 |
| PCM Scheduler EndPoint Agent | 9/4/20 | 0xB0C2FDAC14A9F9AA | PC | OS1 | Remove | — 752 |

748 — Level 750 — Type

SYSTEM, METHOD, AND APPARATUS FOR ENHANCED WHITELISTING

CROSS-REFERENCE TO RELATED APPLICATION

This application is a continuation-in-part of U.S. patent application Ser. No. 17/134,716, filed Dec. 28, 2020 which is a continuation-in-part of U.S. patent application Ser. No. 17/018,427, filed Sep. 11, 2020, the disclosure of which are hereby incorporated by reference.

FIELD

This invention relates to computer security and more particularly to a system for providing enhanced white list operations.

BACKGROUND

Currently, many software systems attempt to provide a secure computing environment. Such systems are typically referred to as firewalls, anti-malware software, etc. Any computer (including cellular phones) that is connected to a network is subject to intrusion from that network.

Today, many intrusions start with reception of malicious software, typically a script or executable. Malicious software is typically a software program that gets installed on the user's computer sometime without permission or knowledge of the user. In some instances, the malicious software is delivered to the user in an email, typically an attached file, or from a web site. Upon opening of the file, the malicious software is copied onto the user's computer storage and begins to run.

To prevent such malicious software from infecting a computing environment, some anti-malware software works on a principle of whitelists. With such, any program that is not on a whitelist (e.g., a list of approved programs) is blocked. Therefore, if a new malicious software is introduced to a user's computer, it will likely not be on the whitelist and, therefore, be blocked from executing. A whitelist requires users and/or administrators to constantly update their whitelists to include new programs that are needed/desired. This is a small price to pay for the added security.

Even though whitelisting is more secure, whitelisting does result in more blocking of programs that are not malicious, called false positives. Therefore, more programs that the user knows are trustworthy are blocked from execution until the administrator adds the program to the whitelist, which in some corporate environments, requires requesting such from an information technology (IT) team.

What is needed is a tool to aid the administrator in allowing execution of programs that are likely to be safe (likely not malicious) in a whitelist environment.

SUMMARY

A system for whitelisting is described. The system uses one or more whitelists of trusted programs to determine if a program is safe to run. In the past, as new software is introduced, downloaded and/or run (attempted) by users, execution is prevented because such software is not included in the whitelist. This prevents unauthorized execution of software that may include malware. Once a new program is verified not to contain malware, the new software is added to the whitelist of trusted programs (e.g., by the administrator or an Information Technologist). The system for whitelisting provides options and/or suggestions to the administrators and/or information technology team to allow programs to run beyond those listed in the whitelist based upon rules of known or expected norms. For example, if programs are often executed from a specific directory path or folder (e.g., C:/windows/system32), and there are no known virus programs that are installed in that path, then, after administrator/IT acceptance, other programs that execute from that path are deemed trustworthy and allowed to run. Note that this is an example, and many other types of such overriding is anticipated. As an example, the rules are created by a provider of the system based upon research and monitoring user behaviors as well as activities of other users inside the user's organization, in a geographic location, or worldwide.

In in the above same scenario and in some embodiments, when a virus is detected in a program installed in this same directory path (e.g., file folder) on the user's system or any system in the world, notification of such is distributed to all systems equipped with such whitelisting and permissions previously provided to allow any program to run from that directory path are revoked, requiring the administrator or information technology team to individually add any software programs that are needed to the whitelist, as those residing in that directory path will no longer be allowed to run based upon being in that directory.

Although directory path is one basis for suggesting a grouping in whitelists, other basis is anticipated, for example, all programs sharing a common certification as a known program that is already on the whitelist or recognizing new programs that are installed weekly on the same day and into the same path. In some embodiments, multiple basis is combined such as sharing a common certificate and a common directory path. In some embodiments, history of the administrator and/or external administrators is monitored so that if one administrator has allowed execution of a particular program several times or if many administrators have added a particular program to their whitelist, that program is deemed benign and the administrator receives recommendations to add it to their whitelist by such rules.

In one embodiment, the system for computer security is disclosed. The system for computer security protects a target computer on which computer security system software is stored in non-transitory storage of the target computer. The computer security system software runs on the target computer. A whitelist is accessible by the computer security system software (e.g., stored in local storage, accessible from a server, cloud-based storage, etc.). The whitelist contains entries indicative of which programs are allowed to run on the target computer. When a program attempts to execute on the target computer, the computer security system software determines whether the program is allowed to run using the whitelist and when the program is allowed to run, the computer security system software running on the computer allows the program to run. When the program is prevented from running, data regarding the program is captured and stored. After the program is prevented from running, a set of rules accessible by administrative software determines if the program is within a class of the programs and when the program is within the class of programs, the administrative software presents a user interface for an administrator that suggests the class of the programs. The administrative software then accepts inputs and upon acceptance of the class of the programs, the administrative software updates the whitelist to add an entry that allows execution of the programs in the class of the programs.

When the program is not within the class of the programs, the administrative software presents a second user interface for the administrator that request approval solely for the program and the administrative software again accepts inputs and upon acceptance of the programs, the administrative software updates the whitelist to add the entry for the program. Otherwise, the whitelist is not updated and future attempts to run the program will not be allowed.

In another embodiment, the system for computer security is disclosed. The system for computer security protects a target computer on which computer security system software is stored in non-transitory storage of the target computer. The computer security system software runs on the target computer. A whitelist is accessible by the computer security system software (e.g., stored in local storage, accessible from a server, cloud-based storage, etc.). The whitelist contains entries indicative of which programs are allowed to run on the target computer. When a program attempts to execute on the target computer, the computer security system software determines whether the program is allowed to run using the whitelist and when the program is allowed to run, the computer security system software running on the computer allows the program to run. When the program is prevented from running, data regarding the program is captured and stored. After the program is prevented from running (e.g., when an administrator is contacted or performs routine administration), a set of rules determines if the program is within a class of the programs and when the program is within the class of programs, administrative software presents a user interface for an administrator that suggests the class of the programs. Upon receiving an acceptance of the class of the programs, the administrative software updates the whitelist to add an entry that allows execution of the programs in the class of the programs. Otherwise, the administrative software presents a second user interface for an administrator that requests approval solely for the program and upon acceptance, the administrative software updates the whitelist to add the entry for the program. Otherwise, the whitelist is not updated and future attempts to run the program will be blocked.

In another embodiment, a method for protecting a computer system is disclosed. Upon a program attempting to be run on the target computer, it is determined whether the program is allowed to run based upon an entry in a whitelist and when the program is allowed to run based upon the entry in the whitelist, the program is allowed to run on the target computer; otherwise, the program is prevented from running and storing data regarding the program. Later (e.g., when called or when performing administrative functions), the data regarding the program is retrieved and if the data indicates that the program is within a class of programs, approval to allow future executions of all programs in the class of programs is requested, and upon approval, an entry is added to the whitelist that enables future execution of the programs in the class of programs. Otherwise, approval to allow future executions of only the program is requested and if allowed, an entry is added to the whitelist to allow future execution of the program. Otherwise, future executions of the program are not allowed.

BRIEF DESCRIPTION OF THE DRAWINGS

The invention can be best understood by those having ordinary skill in the art, by referencing the following detailed description when considering the accompanying drawings, in which:

FIG. 7 illustrates an exemplary white list of the computer security system with enhanced whitelisting.

FIGS. 11-16 illustrate exemplary administrator user interfaces of the computer security system with enhanced whitelisting.

DETAILED DESCRIPTION

Figure 1:
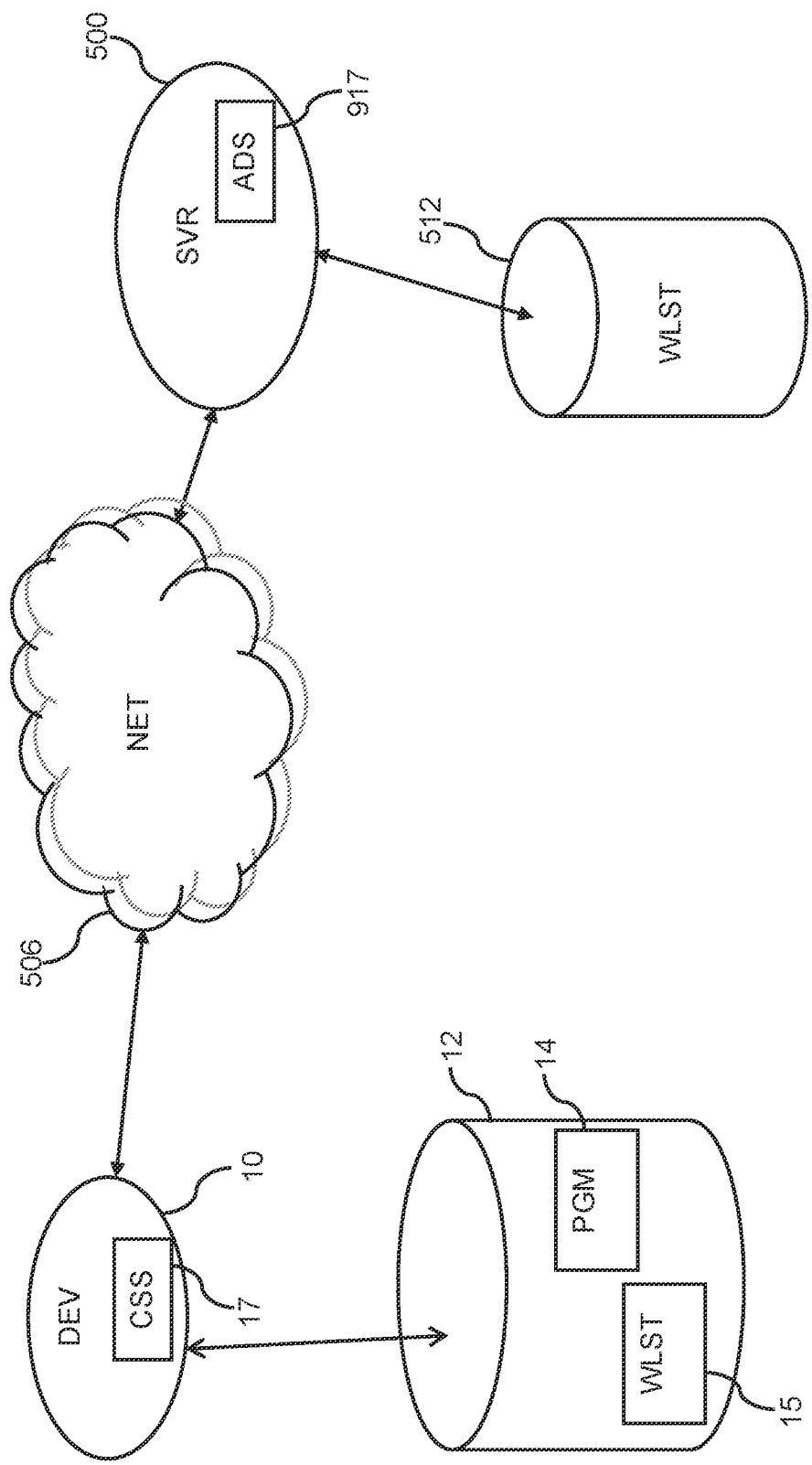
FIG. 1 illustrates a data connection diagram of the computer security system with enhanced whitelisting.

Reference will now be made in detail to the presently preferred embodiments of the invention, examples of which are illustrated in the accompanying drawings. Throughout the following detailed description, the same reference numerals refer to the same elements in all figures.

In general, a whitelist-based computer security system provides an automated way to prevent execution of software containing code that is potentially contaminated (e.g., contains or is malicious software). Before execution of any code on the target computer system, a test is performed by checking one or more whitelists to determine if the code has been approved for execution on the target computer system and, if the code is on the whitelist, allowing execution of the code. Otherwise, the computer security system blocks execution.

Throughout this description, the term, "computer" refers to any system that has a processor and runs software. Examples of such are: a personal computer, a server, a notebook computer, a tablet computer, a smartphone, a smart watch, a smart television, etc. The term, "user" refers to a human that has an interest in the computer, perhaps a user who is using the computer.

Throughout this description, the term "directory" or "directory path" describes a hierarchical pathway to a particular folder in which files (e.g., data or programs) are stored. For example, "C:/windows/system32" refers to files stored in a folder called "system32" which is a subfolder of another folder called "windows" which is a top-level folder of a storage device known as "C." Note that the storage device (e.g., C:) is at times a physical device (e.g., a separate disk drive) or a logical device (e.g., a portion of a disk drive). Also note that the described representation (e.g., "C:/windows/system32") is a human-readable representation of such hierarchy used by certain operating systems and any such representation is anticipated and included herein (e.g., some representations use backslashes instead of slashes).

Throughout this description, the term, "malicious software" or "malware" refers to any software having ill-intent. Many forms of malicious software are known; some that destroy data on the host computer; some that capture information such as account numbers, passwords, etc.; some that fish for information (phishing), pretending to be a known entity to fool the user into providing information such as bank account numbers; some encrypt data on the computer and hold the data at ransom, etc. A computer virus is a form of malicious software.

In general, the user of the system, method, and apparatus being described utilizes efficient storage and retrieval mechanisms to determine if a program (e.g., an executable, macro, form, etc.) is identified within a list called a whitelist. A hash table is one such mechanism, though other mechanisms are equally anticipated and included here within. As an efficient way of characterizing the questionable program, in some embodiments, it is anticipated that rather than storing the entire program in such tables, a portion of the program is stored, often referred to as a signature of the program. The signature contains key sequences found within the program; finding of such key sequences typically indicates that the program matches the signature.

Referring to FIG. 1 illustrates a data connection diagram of the exemplary computer security system with enhanced whitelisting. In this example, a target computer 10 (e.g., a personal computer that is being protected) communicates through a network 506 (e.g., the Internet, local area network, etc.) to a server computer 500.

The server computer 500 has access to data storage 512. One item in the data storage 512 is a whitelist 15; for example, a whitelist 15 of programs/applications that are known to be of low risk of malware. In some embodiments, the data storage 512 is in the cloud.

Although one path between the target computer 10 and the server computer 500 is shown going through the network 506 as shown, any known data path is anticipated. For example, the Wi-Fi transceiver 96 (see FIG. 2) of the target computer 10 is used to communicate with the wide area network 506, which includes the Internet, and, consequently, with the server computer 500.

The server computer 500 transacts with computer security system software that runs on the target computer 10 through the network(s) 506. The computer security system software 17 runs on the target computer 10 and monitors any activation of programs/applications/scripts (e.g., running of a program) and provides or denies permission for running the program/application/script on the target computer 10. The program/application/script is allowed to run when the programs/applications/scripts is deemed malware-free (e.g., is in the whitelist 15). Information is also transferred from computer security system software 17 that runs on the target computer 10 to the server computer 500 regarding potential threats, etc.

The server computer 500 transacts with the computer security system software 17 that runs on the target computer 10 as needed, for example, to update the whitelists 15 stored on the target computer 10.

The computer security system software 17 that runs on the target computer 10 selectively provides execution approval to software that attempts to execute on the target computer 10. In such, if approval is provided, the software is able to execute on the target computer 10. If approval is not provided, the software is blocked from executing on the target computer 10 and various additional steps are taken such as logging the attempt, transferring the suspect software to the server computer 500 for analysis, and informing the user of the target computer 10, etc.

Figure 2:
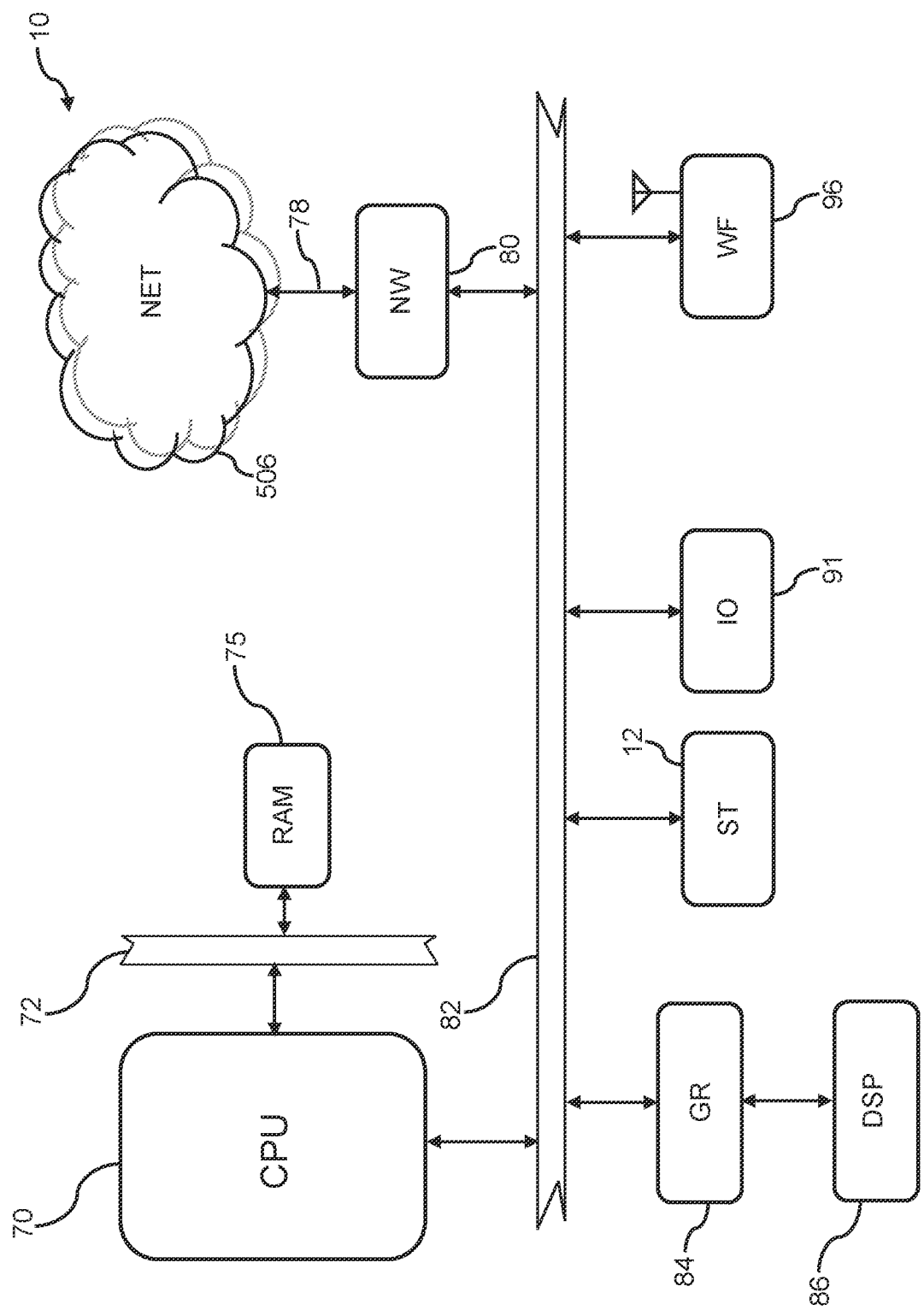
FIG. 2 illustrates a schematic view of a typical computer protected by the computer security system with enhanced whitelisting.

Referring to FIG. 2, a schematic view of a typical target computer 10 is shown. The computer security system software 17 running on the target computer 10 executes on any processor-based device (e.g., target computer 10) for providing protection against programs/applications/scripts that contain malicious software (malware). The present invention is in no way limited to any particular computer. Protection for many other processor-based devices are equally anticipated including, but not limited to smart phones, cellular phones, portable digital assistants, routers, thermostats, fitness devices, smart watches etc.

The example target computer 10 represents a typical device that is protected by computer security system software 17 that runs on the target computer 10. This exemplary target computer 10 is shown in its simplest form. Different architectures are known that accomplish similar results in a similar fashion, and the present invention is not limited in any way to any particular computer system architecture or implementation. In this exemplary target computer 10, a processor 70 executes or runs programs in a random-access memory 75. The programs are generally stored within a persistent memory, storage 12, and loaded into the random-access memory 75 when needed. The processor 70 is any processor, typically a processor designed for phones. The random-access memory 75 is interfaced to the processor by, for example, a memory bus 72. The random-access memory 75 is any memory suitable for connection and operation with the selected processor 70, such as SRAM, DRAM, SDRAM, RDRAM, DDR, DDR-2, etc. The storage 12 is any type, configuration, capacity of memory suitable for persistently storing data, for example, flash memory, read only memory, battery-backed memory, hard disk, etc. In some exemplary target computers 10, the storage 12 is removable, in the form of a memory card of appropriate format such as SD (secure digital) cards, micro SD cards, compact flash, etc.

Also connected to the processor 70 is a system bus 82 for connecting to peripheral subsystems such as a cellular network interface 80, a graphics adapter 84 and user I/O devices 91 such as mice, keyboards, touchscreens, etc. The graphics adapter 84 receives commands from the processor 70 and controls what is depicted on the display 86. The user I/O devices 91 provides navigation and selection features.

In general, some portion of the storage 12 is used to store programs, executable code, and data, etc. In some embodiments, other data is stored in the storage 12 such as audio files, video files, text messages, etc.

The peripherals shown are examples, and other devices are known in the industry such as Global Positioning Subsystems, speakers, microphones, USB interfaces, cameras, microphones, Bluetooth transceivers, Wi-Fi transceivers 96, image sensors, temperature sensors, etc., the details of which are not shown for brevity and clarity reasons.

In some embodiments, a network interface 80 connects the target computer 10 to the network 506 through any known or future protocol such as Ethernet, Wi-Fi, GSM, TDMA, LTE, etc., through a wired or wireless medium 78. There is no limitation on the type of connection used. In such, the network interface 80 provides data and messaging connections between the target computer 10 and the server computer 500 through the network 506.

Figure 3:
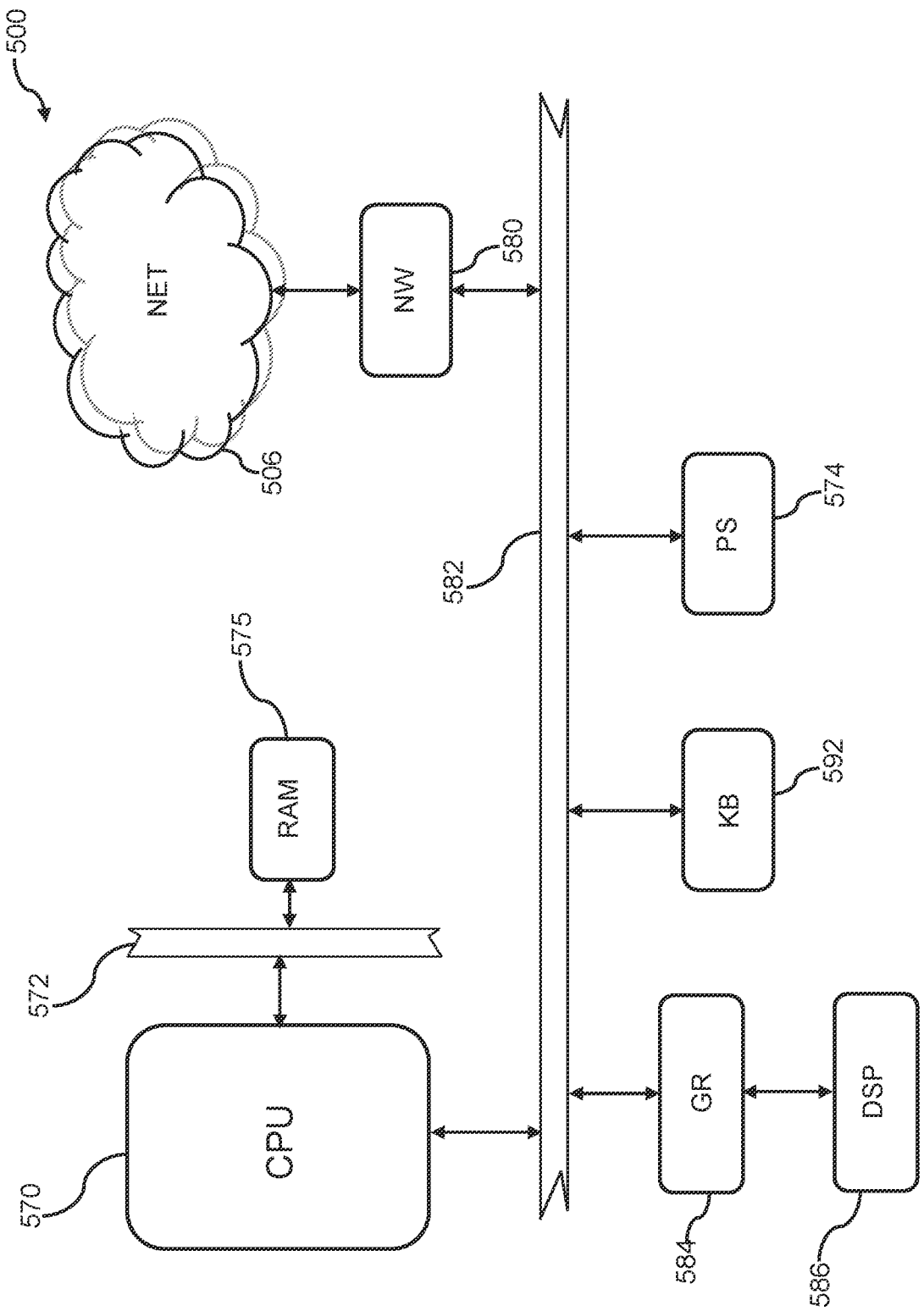
FIG. 3 illustrates a schematic view of a typical server computer system.

Referring to FIG. 3, a schematic view of a typical server computer system (e.g., server computer 500) is shown. The example server computer 500 represents a typical server computer system used for back-end processing, generating reports, displaying data, etc. This exemplary server computer 500 is shown in its simplest form. Different architectures are known that accomplish similar results in a similar fashion and the present invention is not limited in any way to any particular computer system architecture or implementation. In this exemplary computer system, a processor 570 executes or runs programs in a random-access memory 575. The programs are generally stored within a persistent memory 574 and loaded into the random-access memory 575 when needed. The processor 570 is any processor, typically a processor designed for computer systems with any number of core processing elements, etc. The random-access memory 575 is connected to the processor by, for example, a memory bus 572. The random-access memory 575 is any memory suitable for connection and operation with the selected processor 570, such as SRAM, DRAM, SDRAM, RDRAM, DDR, DDR-2, etc. The persistent memory 574 is any type, configuration, capacity of memory suitable for persistently storing data, for example, magnetic storage, flash memory, read only memory, battery-backed memory, magnetic memory, etc. The persistent memory 574 is typically interfaced to the processor 570 through a system bus 582, or any other interface as known in the industry.

Also shown connected to the processor 570 through the system bus 582 is a network interface 580 (e.g., for connecting to a data network 506), a graphics adapter 584 and a keyboard interface 592 (e.g., Universal Serial Bus—USB). The graphics adapter 584 receives commands from the processor 570 and controls what is depicted on a display 586. The keyboard interface 592 provides navigation, data entry, and selection features.

In general, some portion of the persistent memory 574 is used to store programs, executable code, data, and other data, etc.

The peripherals are examples and other devices are known in the industry such as pointing devices, touch-screen interfaces, speakers, microphones, USB interfaces, Bluetooth transceivers, Wi-Fi transceivers, image sensors, temperature sensors, etc., the details of which are not shown for brevity and clarity reasons.

Referring to FIGS. 4, 5, 6, and 6B, exemplary user interfaces 100, 100A, 100B of the computer security system with enhanced whitelisting are shown. Although many user interfaces are anticipated, one set of examples are shown for brevity reasons. The user interfaces 100/100A that are shown represent that a program 14 is stored on the target computer 10. There are many ways for this program 14 to be loaded and initiated on the target computer 10, for example, through an email system, through a browser, through a forms interface, etc. The computer security system software 17 intercepts and processes all requests to initiate operation of any type of program.

Figure 4:
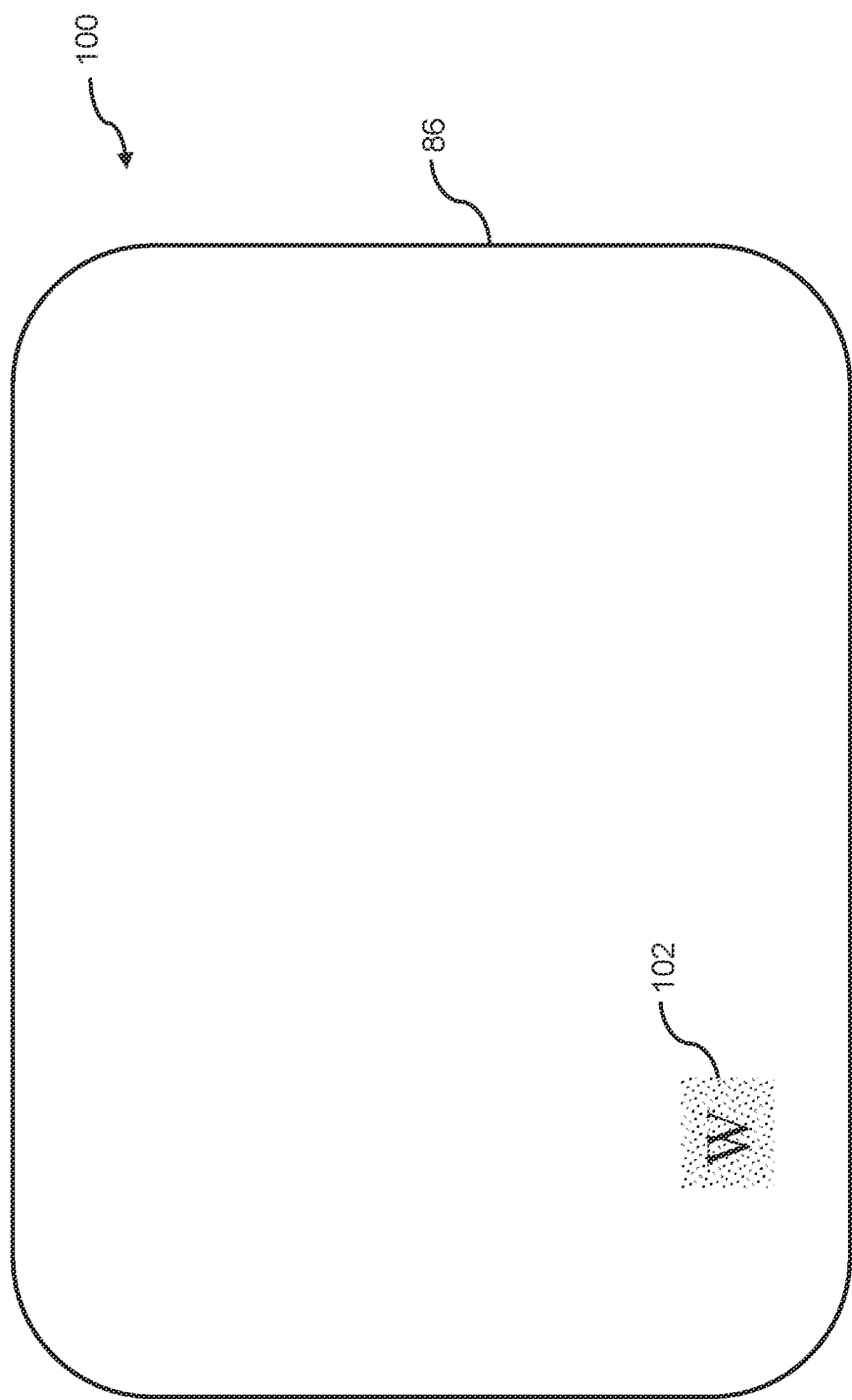
FIG. 4 illustrates a computer user interface of the computer security system with enhanced whitelisting.

One such program 14 is shown as an example in a user interface 100 of FIG. 4. A program 14 (e.g., a word processing program) is represented as an icon 102 on a display 86. As with many windowing programs, a user typically selects the icon 102, usually double-clicking on the icon 102, and the operating system and/or user interface software initiates execution of the program 14 on the target computer 10. For example, in some operating systems, double clicking on a word processor icon initiates (runs) a word processing program that is associated with the word processor icon.

After the user selects the icon 102 (e.g., double clicking) and the operating system of the target computer 10 attempts to initiate/run the program 14 associated with the icon 102, the computer security system software 17 analyzes the program 14 associated with the icon 102 and determines if the program 14 is contained in the whitelist 15 (see FIG. 7). If the program 14 associated with the icon 102 is listed in the whitelist 15, the program 14 is deemed acceptable and is allowed to run. If the program 14 associated with the icon 102 was not found in the whitelist 15, it is unknown and has the potential to be/contain malware. In the latter, the program 14 is prevented from running and an error message 105 is displayed. Notification of an attempt to run the program 14 is made to an administrator of the target computer 10, for example, a message is sent/displayed to the administrator or a record is added to a logfile either on the target computer 10, the server computer 500, or both. For the remainder of this description, the administrative software 917 will be described as running on the server computer 500, though it is equally anticipated that the administrative software 917 runs on the target computer 10 or any device.

Based upon user security settings and global information, the administrative software 917 will make intelligent decisions as to whether the program 14 associated with the icon 102 is dangerous based upon any of several factors, and if it is determined that the program 14 associated with the icon 102 is not dangerous, the administrative software 917 will add the program 14 to the whitelist 15 to permit future execution of the program 14 associated with the icon 102.

Figure 6:
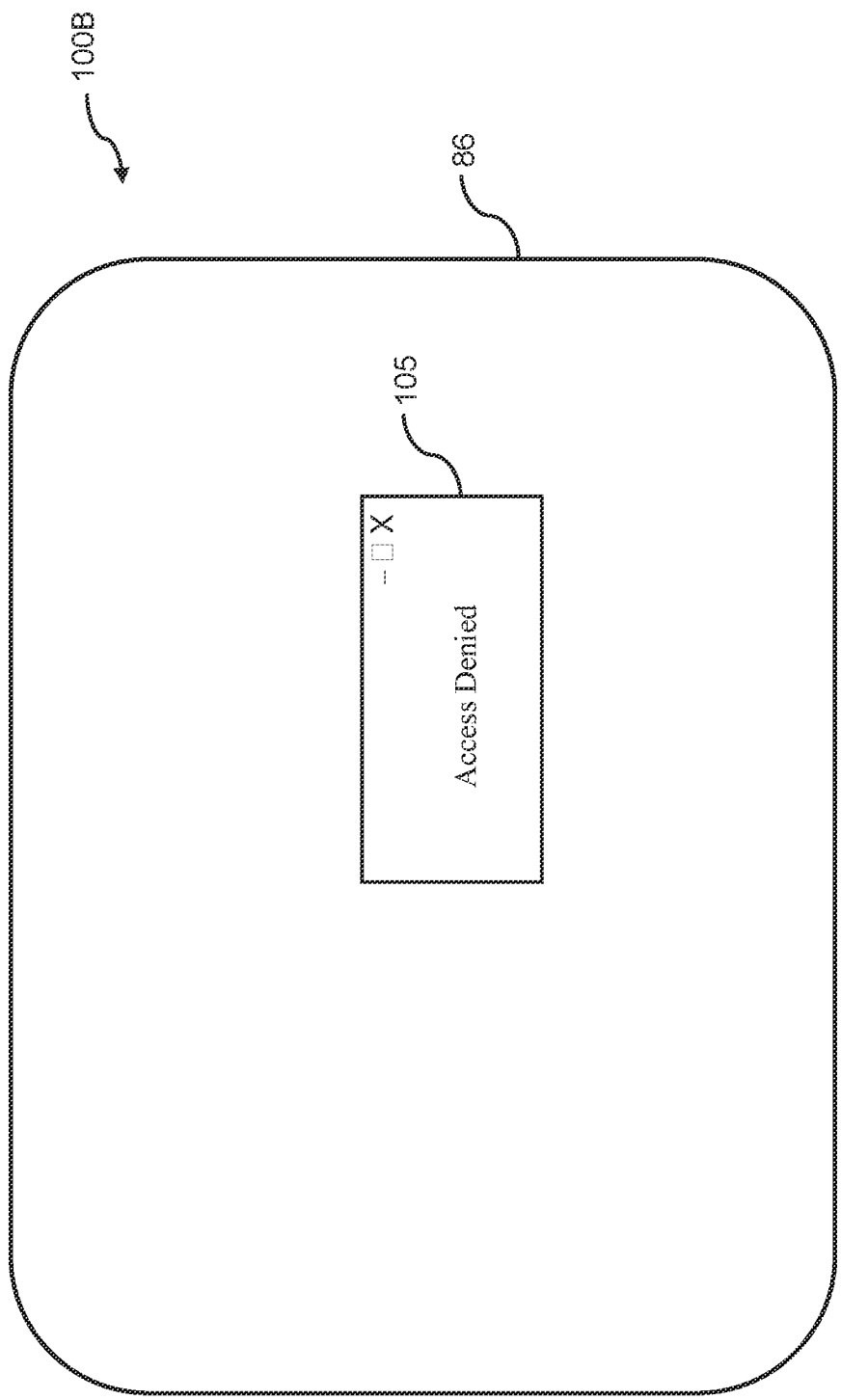
FIG. 6 illustrates a third computer user interface of the computer security system with enhanced whitelisting.
Figure 6A:
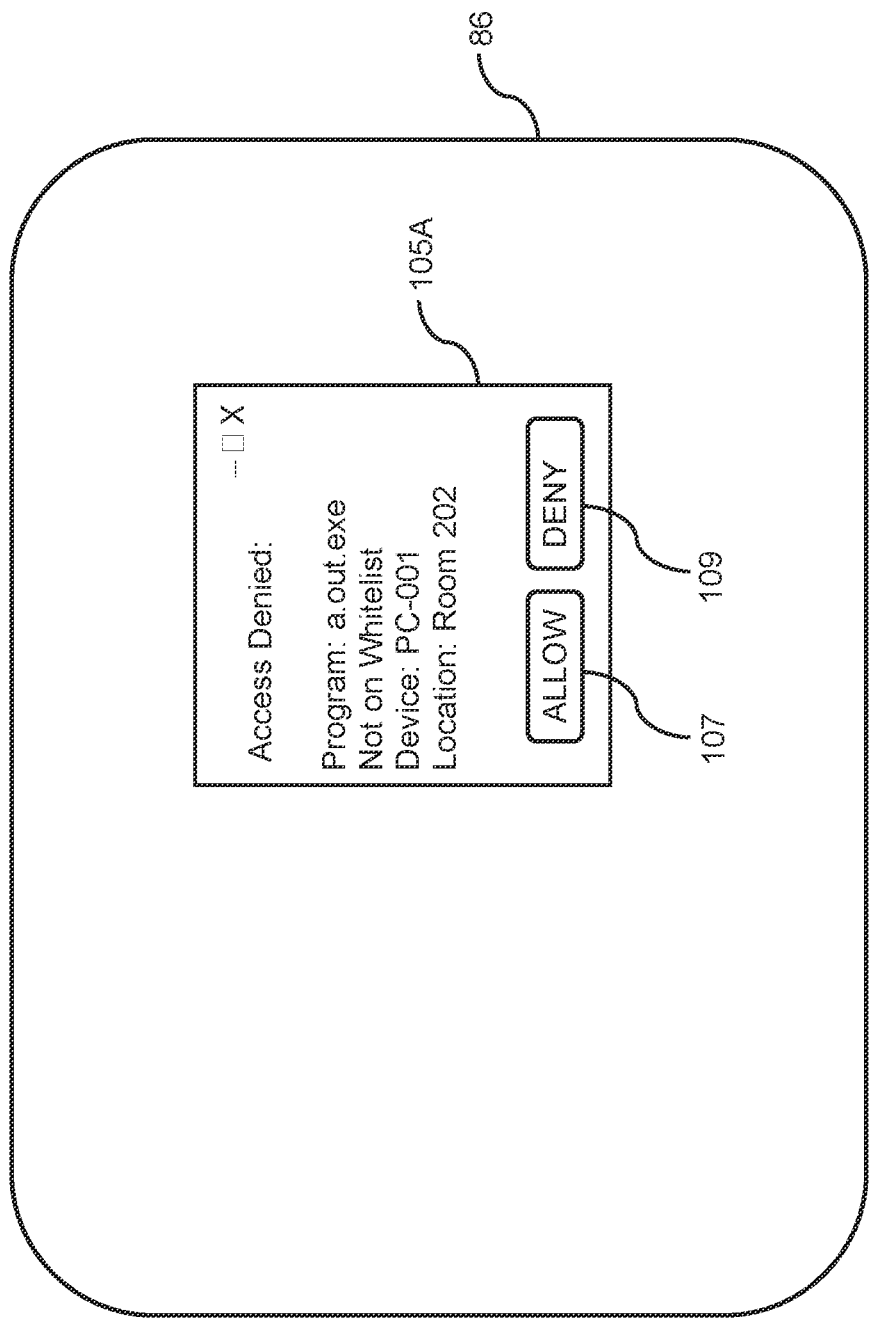
FIG. 6A illustrates a computer user interface of the prior art.

In the past, the administrator would review the logfiles or be presented with a user interface 105A as shown in FIG. 6A. The user interface 105A includes a message window that describes the program 14 that was attempted to be executed, the location where the program 14 was attempted to be executed, other information regarding the program 14 and selection icons 107/109. In the prior art, the administrator had the ability to either allow 107 or deny 109 future executions of the program 14 (e.g., either add the program 14 to the whitelist or not add the program 14 to the whitelist).

Instead of a simple allow/deny administrator user interface 105A, the system for computer security provides enhanced tools to the administrator to reduce frustrations of users of the target computers 10 by applying heuristics and historical data to the event (the attempted execution) and to present alternatives that will allow future executions of, not only the program 14, but of other programs that by nature of the program 14, are likely to be benign. The program 14 and other programs form a program classification or a group of programs that have in common a folder in which they are stored, a certification, an origin company, etc. For example, when a software suite such as an office suite is installed into a folder, initially all programs in that folder are not in the whitelist and execution is blocked, but all are within the same program classification of execution folder. When the first program attempts to run (e.g., a word processor), it is blocked until an administrator adds it to the whitelist. If the administrator adds the word processor to the whitelist, later when the spreadsheet program attempts to run, it too is blocked. Instead, if the administrator recognizes that the word processor is part of an installed package, the administrator can add the entire program classification to the whitelist, for example, the classification of all programs running from the same directory or the classification of all programs sharing the digital signature of the word processor.

Figure 6B:
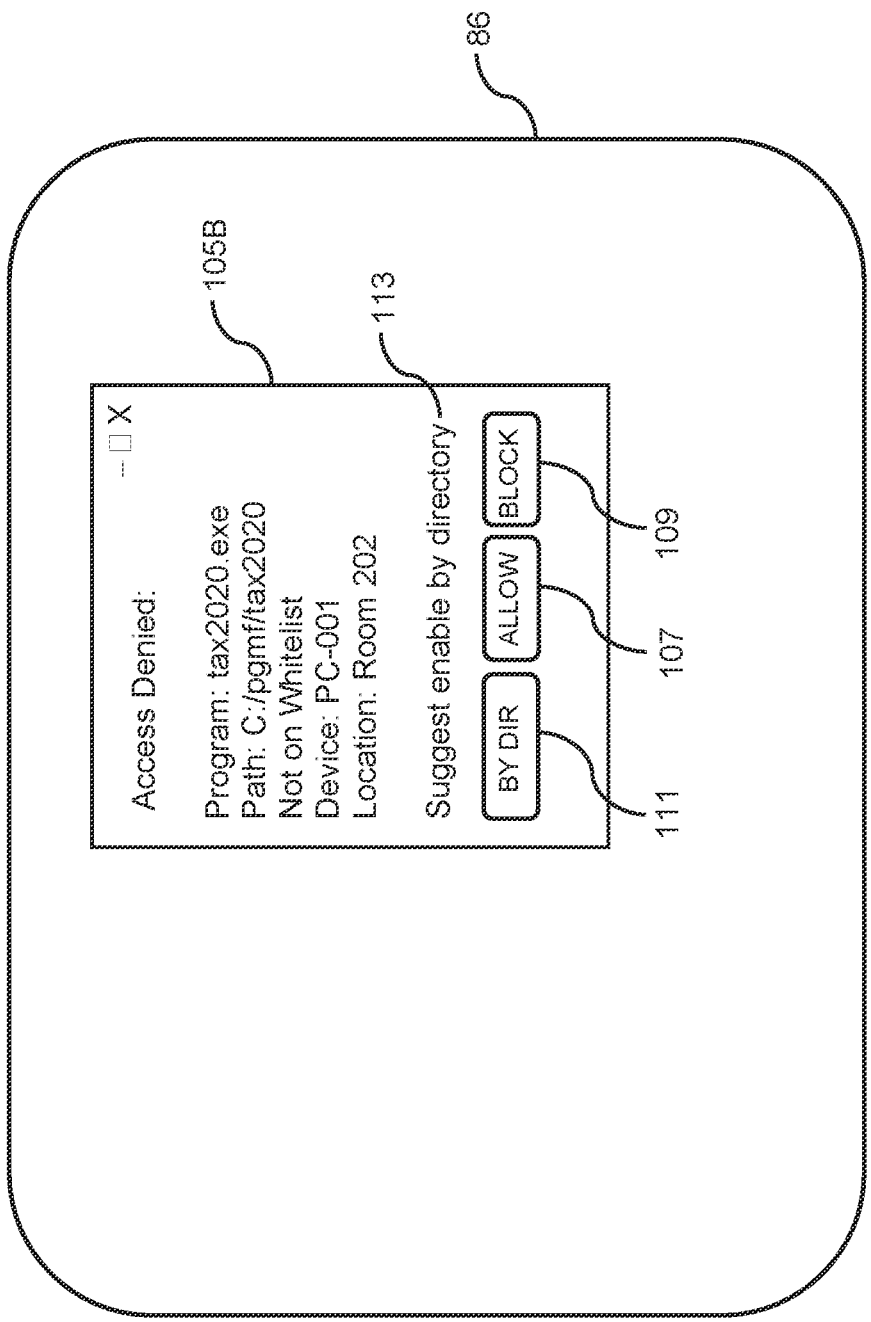
FIGS. 6B, 6C, 6D, and 6E illustrate computer user interfaces of the computer security system with enhanced whitelisting.
Figure 6C:
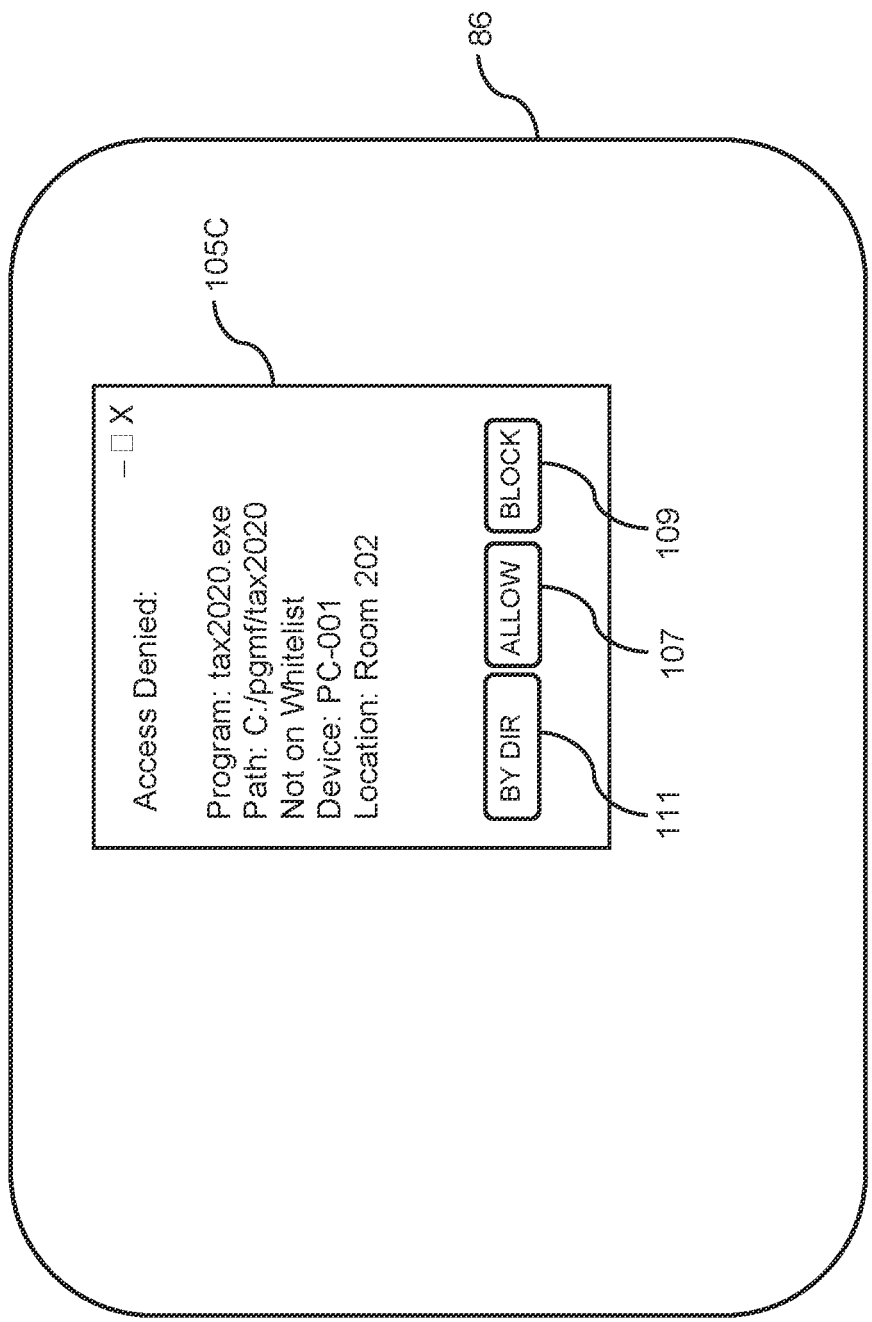
Figure 6D:
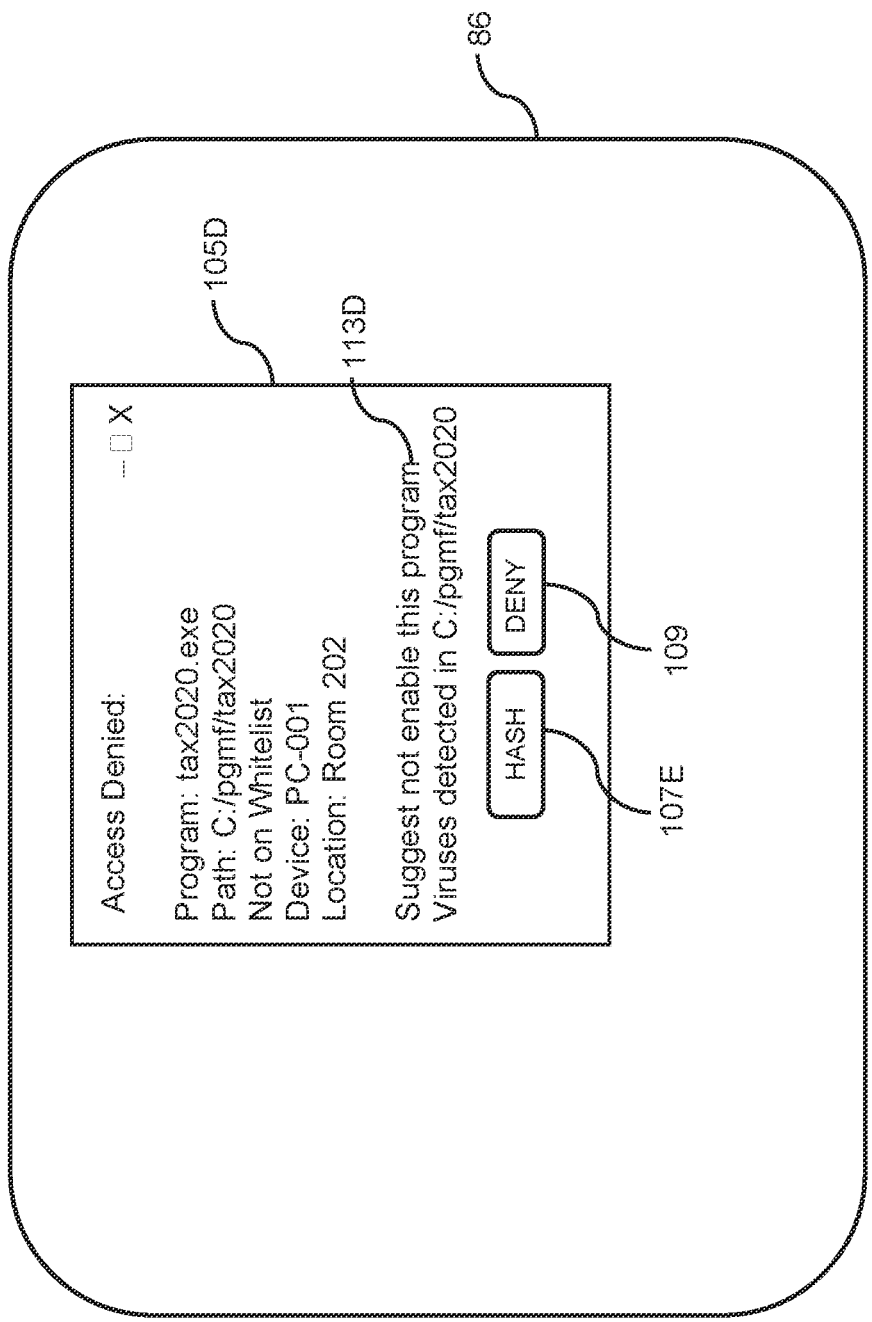
Figure 6E:
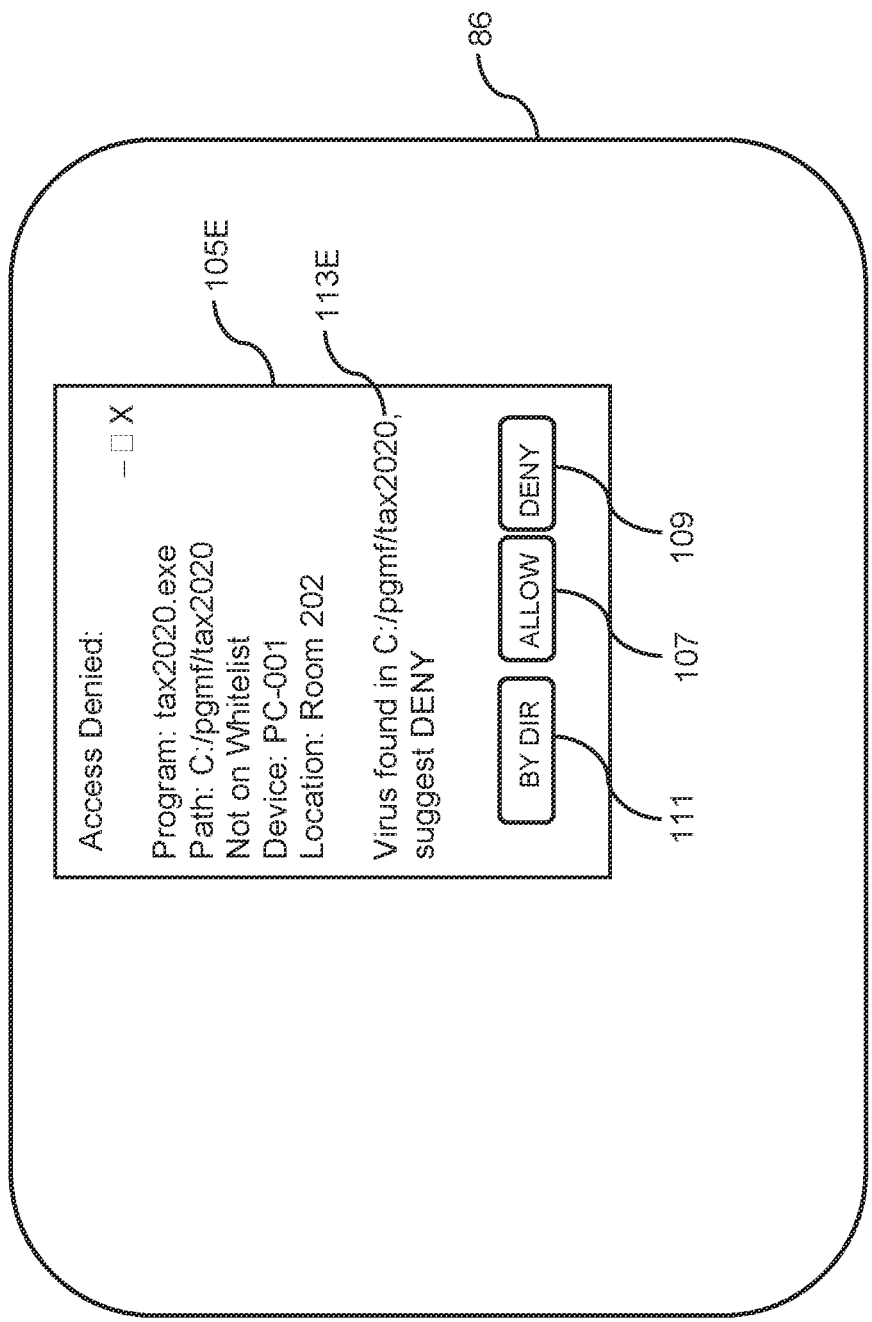

An exemplary administrative interface 105B is shown in FIG. 6B, providing a directive to allow a class of programs 14 to run that reside in the same directory or file folder.

For example, if a user is using a tax preparation software package, every time the user starts that tax preparation software package, the tax preparation software package checks for updates as tax laws change daily, downloads new software, and the tax preparation software package restarts. If, as in the past, the tax preparation software package was added to the whitelist with, for example, a hash value, the new software would not match the hash value stored in the whitelist and would not be run (the newly downloaded program is not on the whitelist). Instead, given the history and execution environment of the tax preparation software package, an analysis is made by heuristics and, based upon acquired intelligence and history, it is recommended that the administrator allow execution of the software based upon the name of the software (e.g., "taxsw.exe") and the location that the software is stored (e.g., "C:/program files/my-tax2020"). In this way, future updates to the software will be allowed to run on the target computer 10 without administrative actions.

Although there are many anticipated ways to make this intelligent recommendation, one example includes the file location from which the program 14 comes. In one example, if the program 14 is stored in a directory from which other program(s) are stored and those other programs are already in the whitelist 15, then there is a greater chance that the program 14 is benign, as virus software usually tries to hide in directories that are rarely visited. As an example, when a user that often executes one program that is stored in a directory "C:/PgmFiles/mytrustedapps," tries to run another program from that same directory, it is more than likely that the second program is benign. In such, upon approval of the administrator, execution of any program in said directory (program classification) will be permitted. It is also anticipated that, in some embodiments, when it is uncovered (local, company-wide, or worldwide) that a program is detected to contain malware that is stored in this directory, such approval will be revoked. Therefore, as malware evolves and someone creates malware that utilizes this directory, the server computer 500 receives such information and the administrative software 917 and the computer security system software 17 invalidates the entry in the whitelist 15, requiring the administrator to update the whitelist 15 and add new entries for whichever programs are known to be benign that reside in that directory.

As shown in FIGS. 6B-6E, at some time after the attempt to run a program 14 (e.g., after receiving a call from the user or during routine operations), the administrative software 917 uses the described heuristics to make one or more suggestions 113 (or options) to the administrator in an enhanced user interface 105B, either before the administrator attempts to process the program or as part of the administration of the program. In some embodiments, the suggestions 113 are accompanied with a set of possible actions related to the suggestions. For example, if the program 14 is in a program classification of "all programs in a directory/folder," then the suggestion 113 is to allow by folder and the possible actions are allow-by-folder, allow by hash, allow by filename, deny.

In other embodiments, the administrator is provided with selections for all possible ways to deny or add the program 14 to the whitelist 15. Then, upon making a selection, the heuristics are run to verify what the administrator has selected and, if the verification indicates an issue, the administrator receives guidance as to the best way to add the program 14 to the whitelist.

It is fully anticipated that the described heuristics analyze the program and associated data (e.g., historical data) before or after the administrator is presented with an administrator interface (e.g., enhanced administrator interface 105B) and the heuristics are used to provide suggestions and/or enable or prevent options for the enhanced administrator interface 105B. For example, if a known virus is known to install into a program with the same program name (e.g., tax2020.exe), then in some embodiments, the enhanced administrator interface 105B lacks an option to add the program 14 to the whitelist 15 by program name and only an option to add the program 14 by hash value will be presented so that if the program is modified or replaced, the program will not match the hash value and will not be allowed to run.

It is also fully anticipated that the described heuristics analyze the program and associated data after the administrator is presented with an administrator interface (e.g., administrator interface 105C) and the heuristics are used to provide feedback and/or enable or prevent options for the administrator interface 105C. For example, if a known virus is known to install into a program with the same program name (e.g., tax2020.exe), then in such embodiments, when the administrator selects the by-directory option 111, the warning administrator interface 105D is presented, and the administrator can only choose to allow by hash value 107E or deny 109 (e.g., add to the black list).

In the administrator interfaces 105B/105C/105D/105E, a description of the program is provided to the administrator, along with a suggestion 113 (if any), which in the example administrator user interface 105B is a suggestion 113 to enable execution of programs in the same directory, perhaps because one or more target computers 10 have run one or more of the same or different programs from that same directory in the past few weeks. In the administrator interface 105B, the administrator has the ability to select allowing 107 just that program (as in the past), deny 109 (not allowing execution of this program—e.g., adding the program to a blacklist), or allowing programs in the same directory by way of the by-directory option 111.

Note that there are many ways to implement a whitelist in which a single entry (or record) within the whitelist 15, are of which are anticipated here within. The message that appears in the administrator interface 105B is based upon analysis of the program that is attempted to be run with respect to various aspects of the program such as the program's name, certificate, path/folder, etc. In some embodiments, history is used to suggest a whitelisting strategy, including historic whitelisting by other administrators either within the same company or world-wide. For example, if the program is called "chrome.exe" and was previously enabled by hash value and each time an update to "chrome.exe" is made/loaded, the hash value does not match, the message window of administrator interface 105B will suggest the administrator whitelist by program name so that the user does not find the error the next time "chrome.exe" is updated. Further, if many administrators in the same organization or world-wide have whitelisted "chrome.exe" running out of a specific directory, then the message window of administrator interface 105B would suggest whitelisting "chrome.exe" by name and folder. Further, if many other administrators have whitelisted several programs in the same folder, then the message window of administrator interface 105B will suggest whitelisting the entire folder, etc.

In some embodiments, it is already known that some form of malware utilizes a specific directory such as a download directory or temporary files directory. In such, the server computer 500 periodically receives such information to the administrative software 917. In some embodiments, the administrative software warns the administrator not to enable this program by a suggestion 113D/113E in the warn administrative interface 105D/105E. In other embodiments, the administrative software 917 prevents the administrator from allowing execution of programs found in the requested directory and presents a message administrative interface informing the administrator that the program will not be allowed to run on any system.

Figure 5:
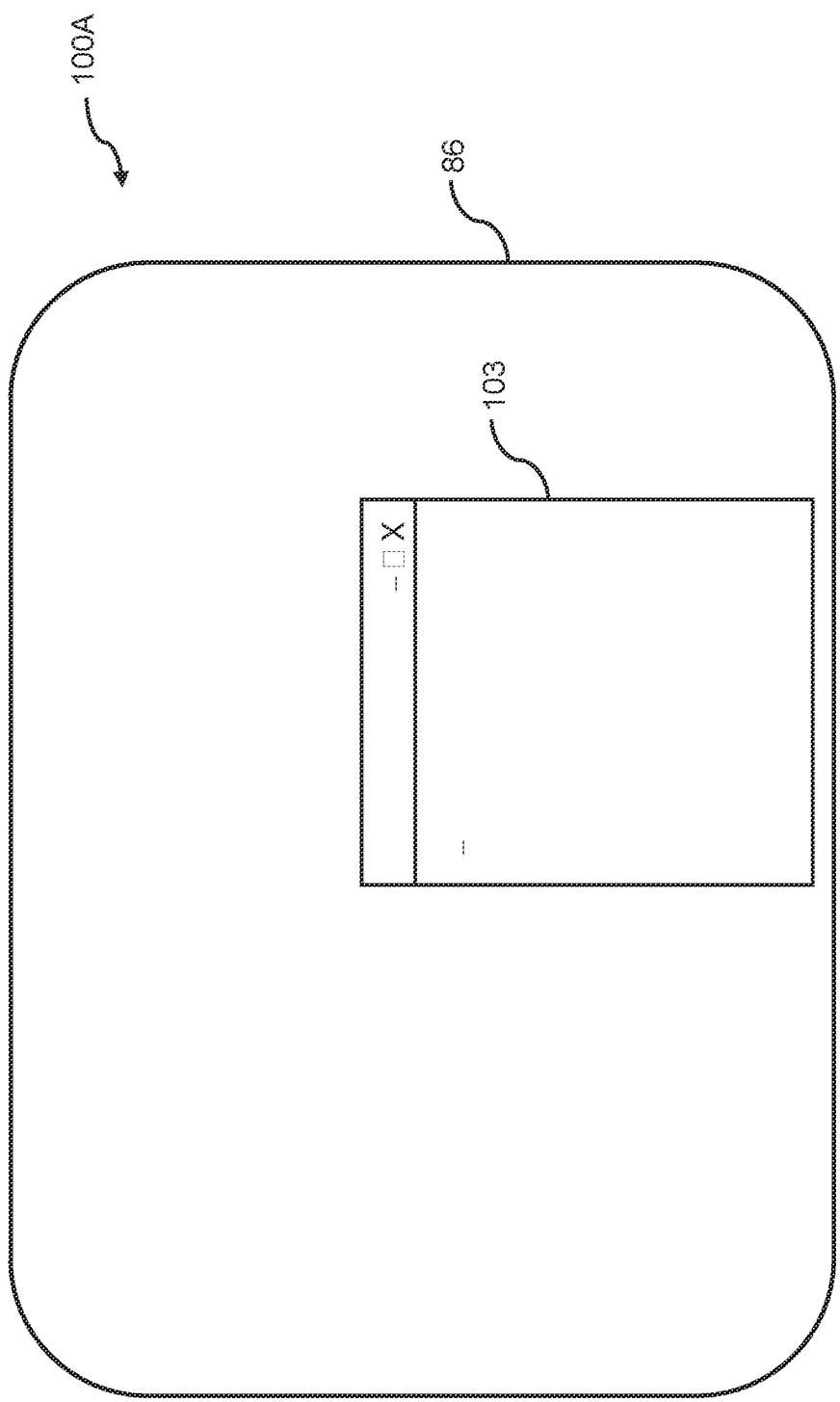
FIG. 5 illustrates a second computer user interface of the computer security system with enhanced whitelisting.

If it is determined that the program 14 is on the whitelist 15 and allowed to execute, the program 14 executes as shown in a user interface 100A of FIG. 5, for example, displaying a user interface window 103.

If, after an attempt to execute the program 14, the program 14 is not found in the whitelist 15, the program 14 is prevented from executing and a user interface 100B of FIG. 6 is presented, displaying an error message 105. After such attempt, information about the attempted execution, the program name, program content, date/time, etc., are logged and/or transmitted to the server computer 500 where the administrative software 917 analyzes the information.

The table of FIG. 7 depicts one implementation of a whitelist 15. As, in many target computers 10, there are many valid programs that are executed often, it is anticipated that in some embodiments, a whitelist 15 be implemented as a hash table for compact storage and speedier access. In some embodiments, there are separate whitelists for each type of whitelisting, for example, one for whitelisting by hash value, one for whitelisting by program name, etc. In this example, there is a single whitelist arranged in linear fashion with entries for each type of whitelisted element (program or directory) in the same whitelist 15.

As an example, when an attempt is made to run a program, the program name is searched in the whitelist 15 (or program name range using wild card or regular expression characters as in "w??word.exe"). If the program name is found, the program is run. If the program name is not found, a hash value of the program is calculated and the whitelist 15 is searched for that hash value. Note that hash algorithms are known and well-understood in the field of programming. If the hash value is found in the whitelist 15, the program is run. Next, the signature of the program is extracted (if the program is signed) and the whitelist is searched for the signature. If the signature is found, the program is run. If the signature is not found, the directory in which the program is located is determined and the whitelist 15 is searched for that directory. If the directory is found, the program is run. If the directory is not found, then it is determined that the program is not in the whitelist and not directly allowed to run.

Each entry of the whitelist 15 includes information regarding the approved program or directory such as the date of approval, the name of the program 602, a hash value of the program 604, and a signature of the program 606. In some embodiments, more or less information is maintained in the whitelist 15. Note that as malware becomes more sophisticated, the malware often masquerades as known, valid programs such as word processors. The hash value of the program 604 is one way to prevent this type of masquerading, as a hash value of a malware version (e.g., having the same name as the valid program) will often be different that a hash value of the program 604, as the malware version of the program will have different internal coding (e.g., the malicious code). In some embodiments, the hash value of the program 604, for example is based upon a summation/modulus or other numerical calculation based upon the entire program or a portion of the program. Any tampering with the program by, for example, a hacker, will change the calculation, resulting in a mismatch between the calculated hash value and the hash value of the program 604 from the whitelist 15, even is a size of the file in which the program is stored matches the size of the valid program.

In some embodiments, identification is by a signature of the program 606 as provided in the whitelist 15. The signature of the program 606, for example is based upon a probing of the entire program or a portion of the program. For example, the presence or absence of certain strings within the program, values at certain locations within the program, etc. Any tampering with the program for example, by a hacker, will change a calculation of the signature(s), resulting in not finding certain expected values within the signature based upon the signature of the program 606 from the whitelist 15.

In this exemplary whitelist 15, one entry added on Sep. 4, 2017, indicates that programs 14 stored within the folder 608, C:/pgmFiles/mytrustedapps, are trusted. In other words, the user tried to execute a program from the folder 608 C:/PgmFiles/mytrustedapps and when the administrator interface 105B was presented to the administrator (see FIG. 6B), the suggestion 113 was "enable by directory" and the administrator invoked the by-directory option 111. In this example, once approved, any program 14 that executes in the folder 608 C:/ProgramFiles/mytrustedapps will be allowed to execute.

Note that the entries include "<any>" for certain fields. For example, in the first line of this exemplary whitelist 15, the name would have to match "winword.exe," but the program can have any hash value, any signature, or be located in any directory. If both name and folder have values, then in order to run the program, the program name would have to match that name and the program would have to be executing out of the identified directory.

Figure 8:
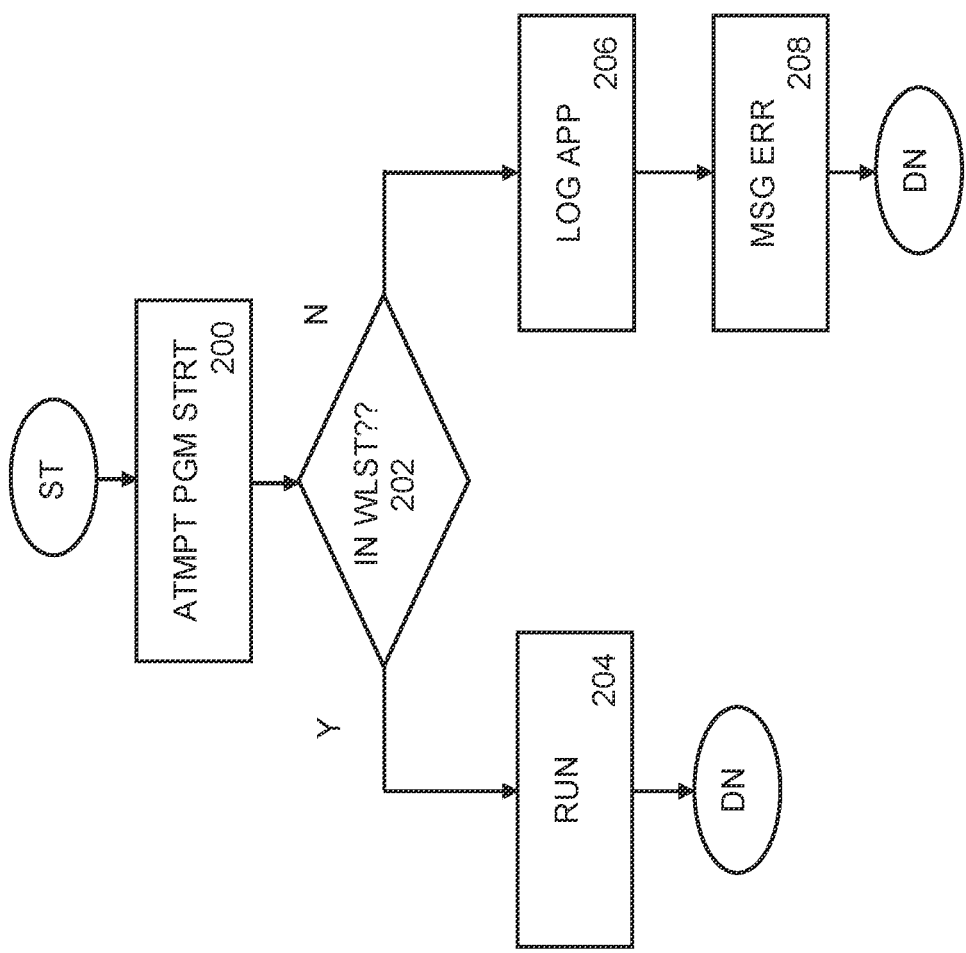
FIGS. 8-10 illustrate exemplary program flows of the computer security system with enhanced whitelisting.
Figure 9:
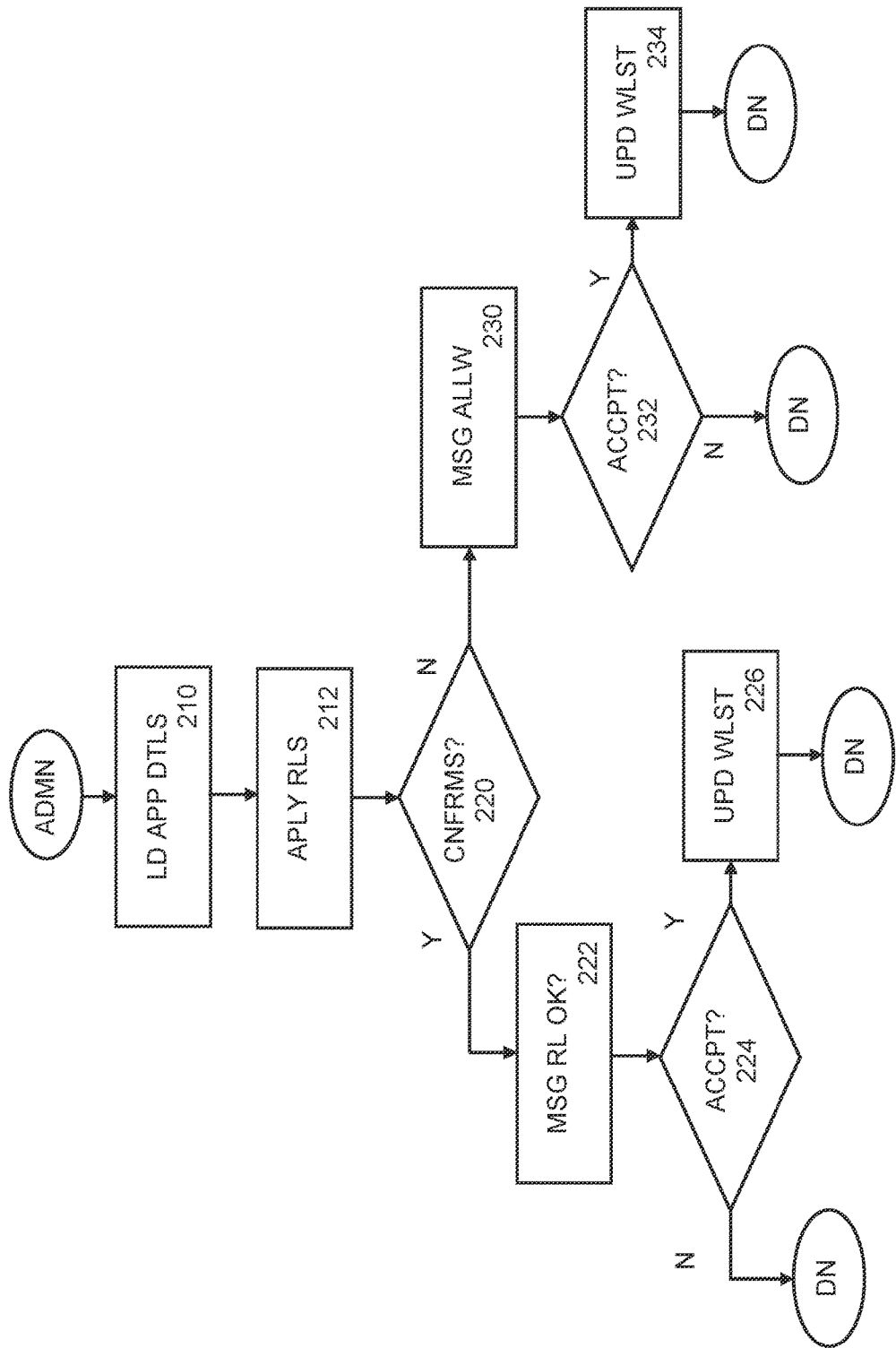
Figure 10:
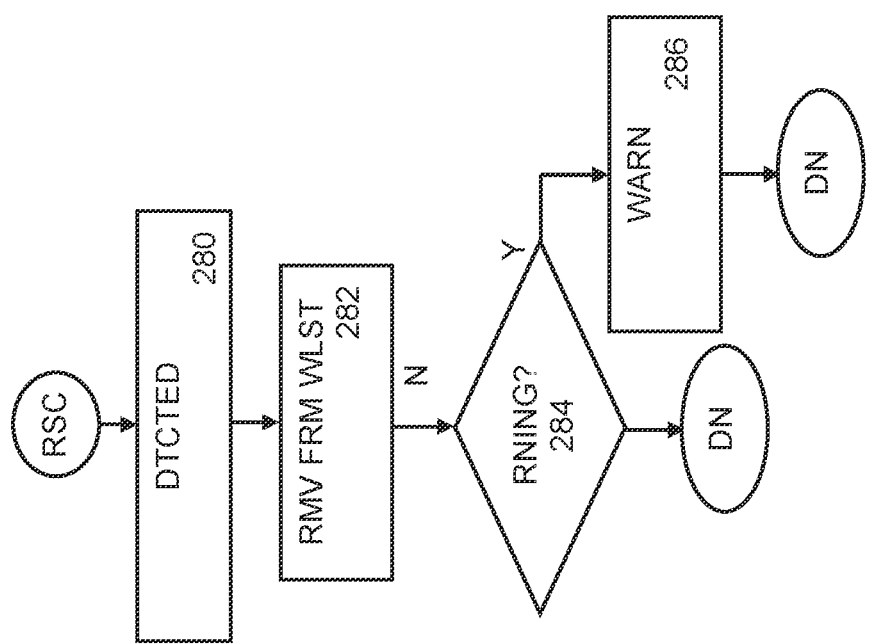

Referring to FIGS. 8-10, exemplary program flows of the computer security system with enhanced whitelisting are shown.

It is anticipated that portions of the exemplary program flow execute on a user device such as the target computer 10 while portions of the exemplary program flow execute on the server computer 500.

In this example, the flow starts by a program 14 attempting to start 200 on the target computer 10. This step is anticipated to be performed through direct or indirect invocation by a user of the target computer 10. In a direct invocation, the user knowingly tries to start the program 14 (e.g., software executable, application, etc.), for example, by double-clicking on a shortcut or icon of that executable. In an indirect invocation, the user initiates execution of an executable by indirect ways such as browsing to a web site, opening an email attachment, etc.

The computer security system determines 202 if the program 14 is in the whitelist 15 using any searching mechanism, including linear searching, binary searching, hash searching, etc. For example, the name of the program is searched and if found, the search is successful. If the name is not found, then a hash value is calculated for the program and the hash value is searched and if not found, other searches are performed.

If it is determined 202 that the program 14 is in the whitelist 15 (e.g., the program is trusted) the program 14 is run 204.

If it is determined 202 that the program 14 is missing from the whitelist 15, the computer security system software 17 records data 206 regarding the attempt including, for example, the program name, directory in which the program is located, user identification (who tried to run the program), time/date, etc. In some embodiments, a message is sent or displayed 208 to an administrator of the target computer 10. This part of the process competes without running of the program 14.

In FIG. 9, program flow of a sample administrative program is shown. At some time after a program 14 is prevented from running as per FIG. 8, the administrator of the target computer 10 discovers this event. In some cases, by a message as per FIG. 8, in some cases, by scanning the log files, and in some cases, by a user contacting the administrator requesting access to the program 14.

In such, application details are accessed 210 from the stored data (e.g., log file) and a set of rules are applied 212 to determine how to handle the program 14. If the program 14 does not conform 220 to the rules, a message is displayed 230 to the administrator requesting if the administrator wishes to allow this program 14 to execute in the future. If the administrator accepts 232 the program 14 to execute, the whitelist 15 for the target computer 10 is updated 234 (and in some examples, other computers), otherwise the administrative program is finished without updating the whitelist 15, and therefore, the program 14 will not be allowed to execute. Note that, in some embodiments, the whitelist 15 for the target computer 10 is a whitelist 15 that is common across several of the target computers 10, for example, all end-user computers in an organization.

If the program 14 conforms 220 to any of the rules to make a decision that extends beyond allowing only that program 14, a message such as those in FIGS. 11-15 is displayed, depending upon the rule that applies to this particular program 14. For example, if the program stored in a safe directory, the administrator is able to update the whitelist 15 to allow all programs stored in that directory. If the program 14 conforms 220 to any of the rules to make a decision that extends beyond allowing only that program 14, in some embodiments, a selection message 222 is displayed asking the administrator to allow all programs the conform to the one specific rule to make a decision that extends to a class of the programs 14 that are beyond allowing solely that program 14, similar to the user interfaces of FIGS. 11-16. Note that it is anticipated that when the program conforms to multiple specific classes (e.g., rules), either the best rule is selected (e.g., the safest rule) or the user is prompted to select one rule out of the multiple rules presented. If the administrator does not accept 224, the flow completes without adding the program 14 to the whitelist 15. If the administrator accepts 224, and the whitelist 15 is updated 226 (and in some examples, updated on other computers) and future attempts to run the program 14 and those programs 14 that conform to the rule will be allowed. In some embodiments, no selection message 222 is displayed, the whitelist 15 is automatically updated 226 and future attempts to run the program 14 and those programs 14 that conform to the rule will be allowed. In some such embodiments, where the rule indicates another program in the whitelist (e.g., approved program) is stored in the same folder as the program 14, a number of approved programs is required (e.g., there must be three approved programs stored in the same folder as the program 14).

Examples of such classes of programs 14 include all programs 14 residing in a particular directory, all programs 14 signed by a certain authority, all programs 14 of a certain name, etc.

In FIG. 9, malware was detected 280 somewhere, either on one of the target computers 10 or anywhere in the world, and such was communicated to the administrative software 917 that runs on the server computer 500. Responsive to the detection, the administrative software 917 removes 282 any entries from the whitelist 15 that would allow execution of the program 14 that was detected 280 to include malware. If it is found that the program 14 is already running 284 on any target computers 10, warning messages 286 are displayed by the computer security system software 17 running on the target computers 10 to warn the user that this program 14 is currently running and it is potentially dangerous and may include malware. In this way, the user can reboot the target computer 10 or use a task manager to kill the already running program. In some embodiments, the program 14 that is currently running is automatically stopped by the computer security system software 17 that is running on the target computer 10.

Referring to FIGS. 10-16, exemplary administrator interfaces of the computer security system are shown. Administrative interfaces are provided for allowing or blocking certain programs on an individual computer or a set of computers. In general, any authorized user (e.g., administrator, IT person) is able to adjust whitelists to accommodate individual programs or a set of programs on one or more computers.

Figure 11:
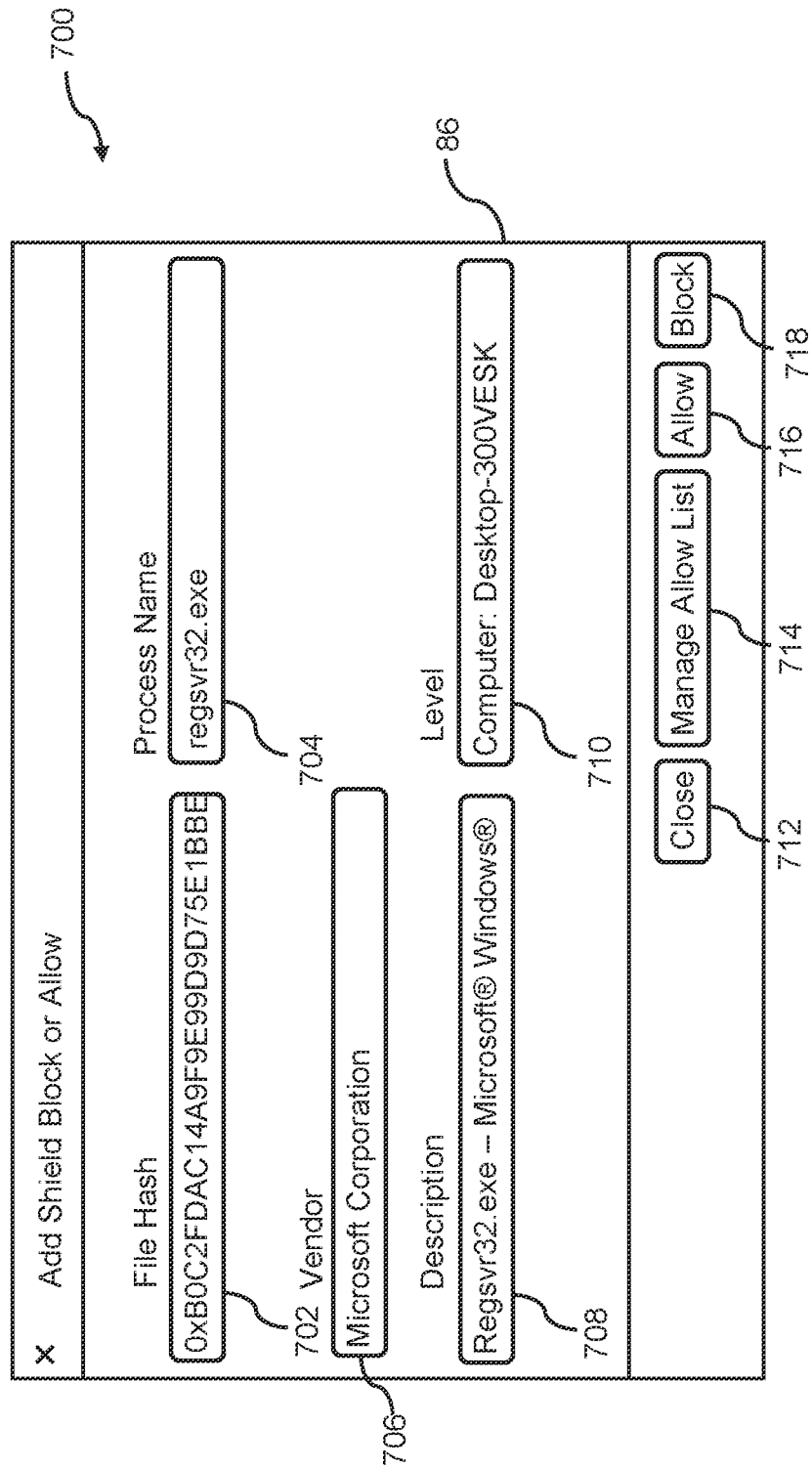

In the example of FIG. 11, an attempt to run a program named "regsvr32.exe" was made and the block or allow administrator interface 700 is displayed. The hash value 702 of the program and name 704 of the program are displayed, along with the vendor/supplier 706, and a description 708 of the program are displayed. In this example, the level 710 has been selected to be "Computer" meaning that this program will only be allowed or blocked on a single target computer 10 (as opposed to all computers in the company, in an account, or in a group in which the user's computer resides). If the "close" feature 712 is selected, nothing happens and the administrator interface exits. If "Manage Allow List" 714 is selected, the administrator is taken to a report administrator interface 740 (see FIG. 16). If the "allow" 716 feature is selected, the identified program is added to the whitelist (list of allowed programs) and future attempts to run the identified program are allowed on all computers in the selected level 710. If the "block" 718 feature is selected, the identified program is not added to the whitelist 15 and, in embodiment having a blacklist, the identified program is added to the blacklist (list of blocked programs) on all computers in the selected level 710.

Figure 12:
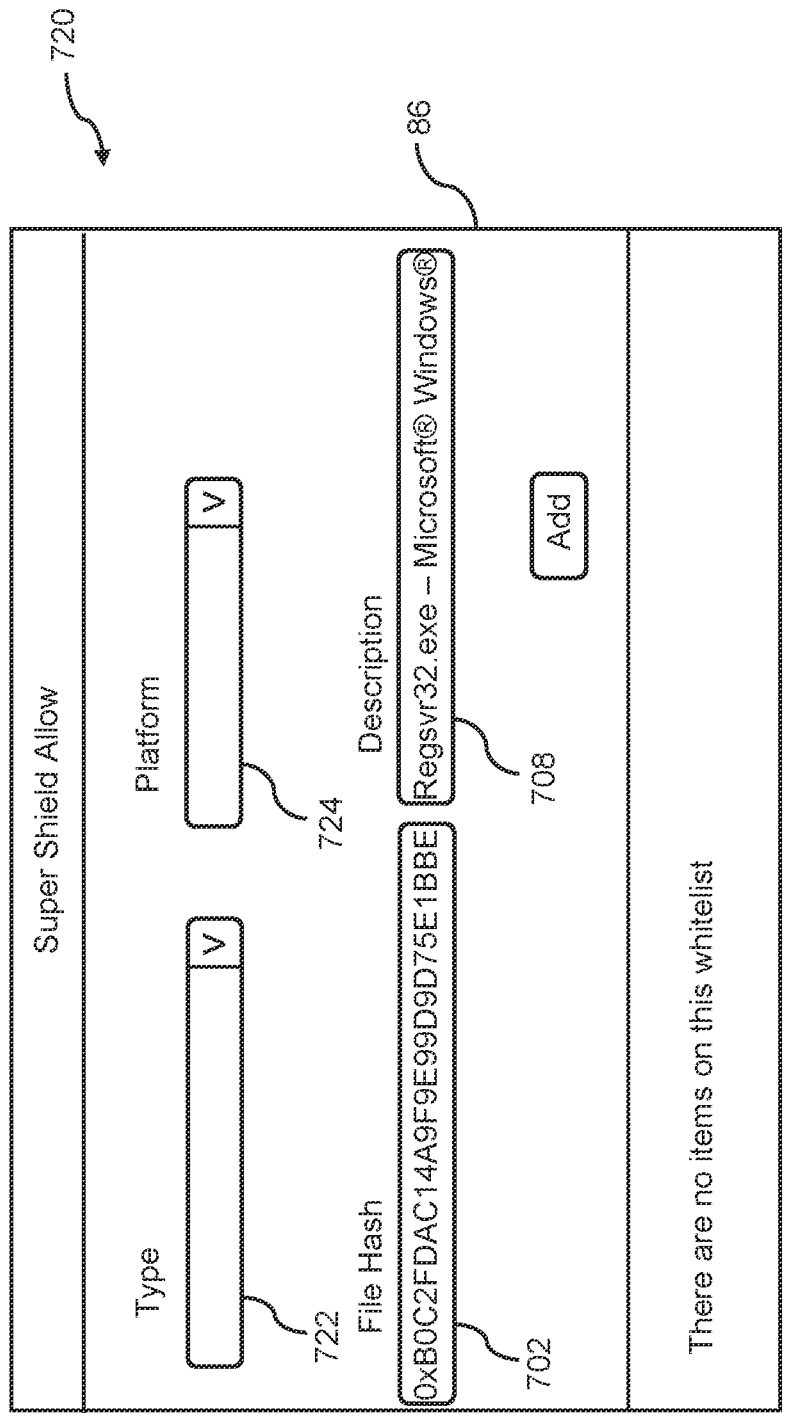
Figure 13:
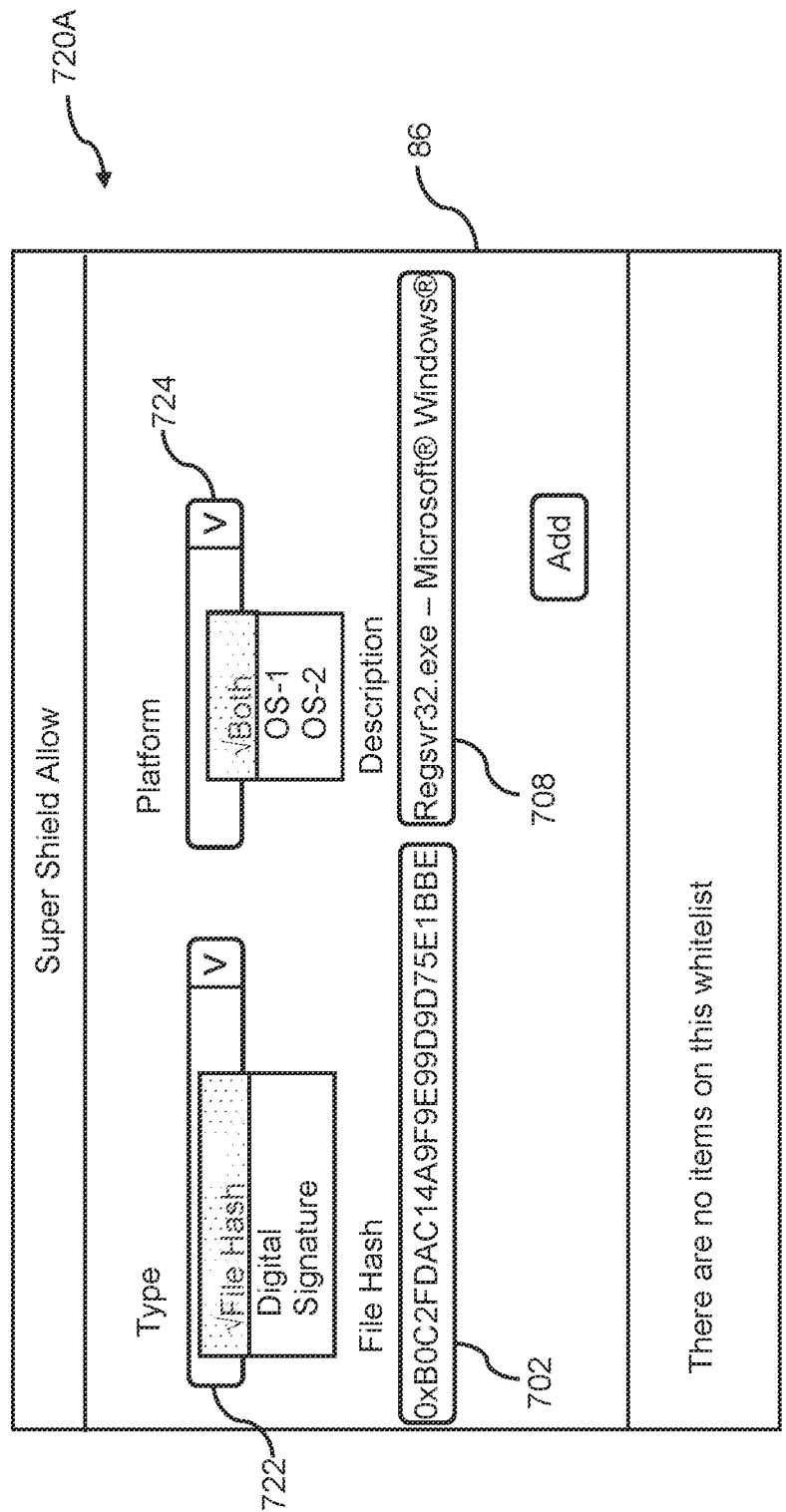

In the example of FIG. 12, an allow administrator interface 720 is displayed. In this, the administrator is prompted to add a program to the whitelist 15 to allow operation of the program on one or more computers. In FIG. 12, the hash value 702 for the program is displayed and a description 708 of the program is displayed (or entered by the administrator). In FIG. 13, the allow administrator interface with pull-downs 720A is shown indicating that the administrator has selected "file hash" as the type and other types are noted such as "Digital" and "Signature." The user has selected "Both" as the platform 724 as the platform and other platforms are noted such as "OS-1" and "OS-2" as many enterprises use computers running different operating systems from different suppliers.

Figure 14:
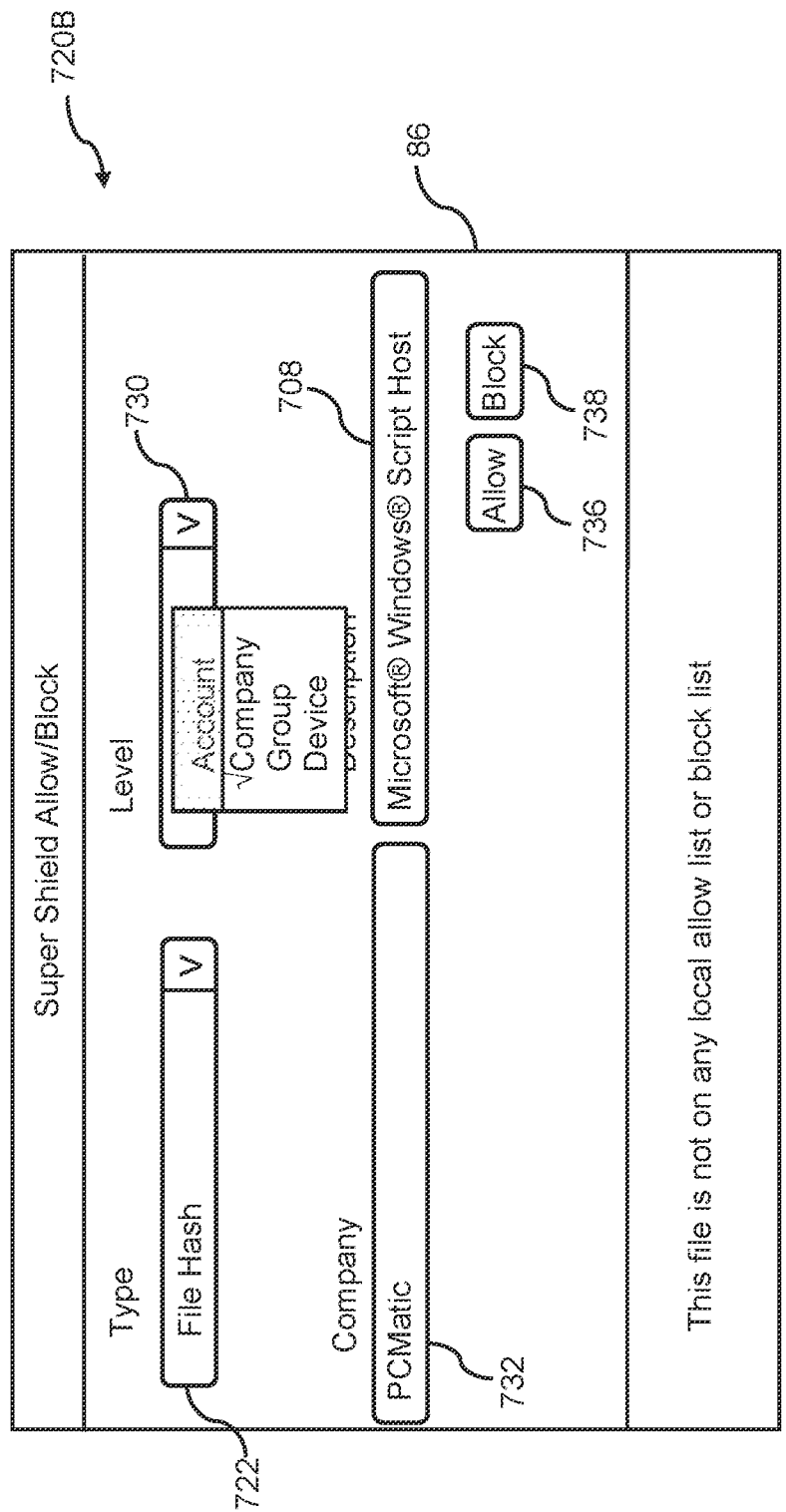
Figure 15:
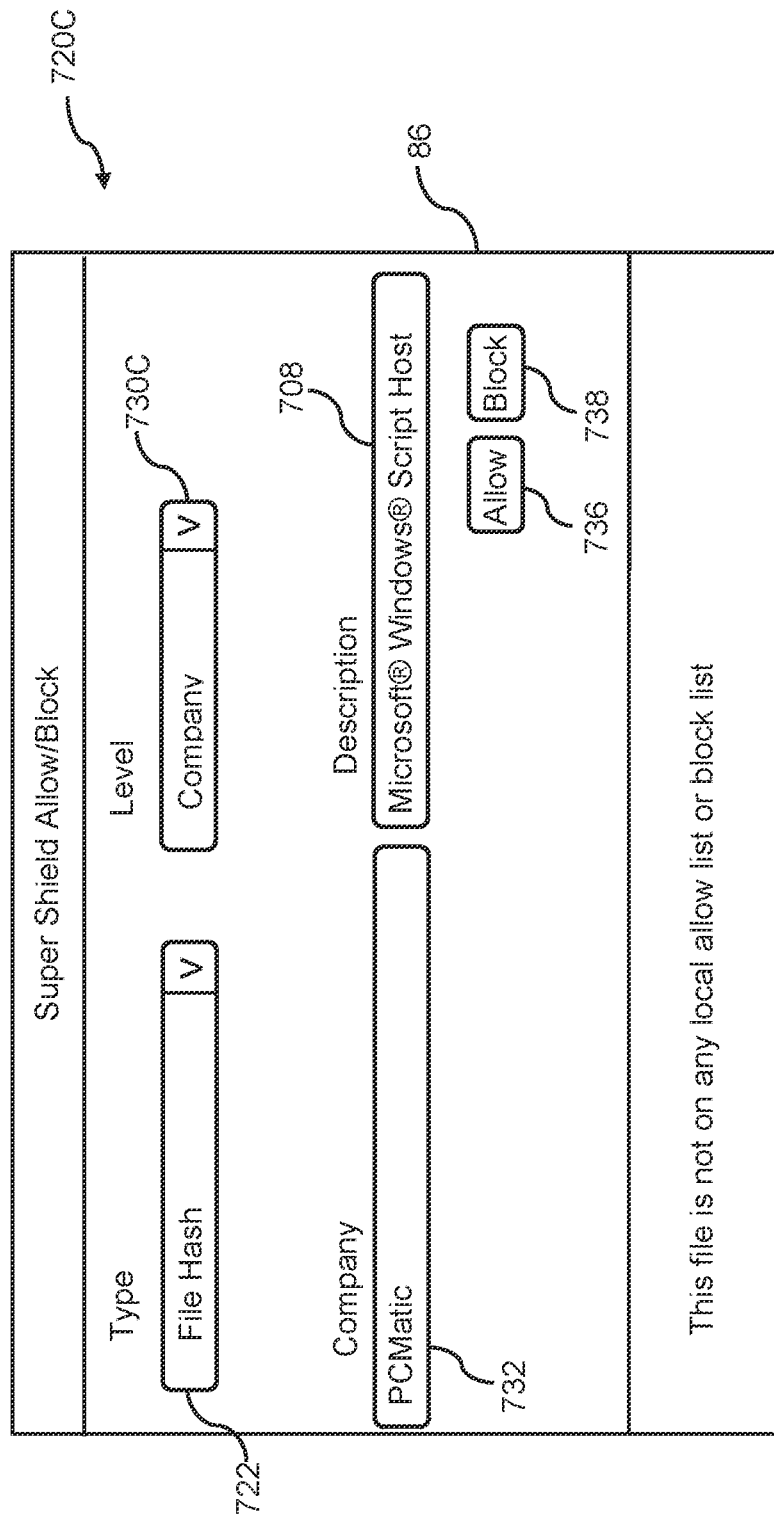

Once done, the administrator selects "add," and a new administrator interface 720B/720C of FIG. 14 is shown indicating the previously selected type 722 ("File Hash") and allowing the administrator to select a level 730 such as "account," "company," "group," or "device." Note that "company has been selected as the level 730C and the name of the company 732 is displayed. At this point, the administrator has the ability to select "allow" 736 to add this program to the whitelists 15 of all computers associated with the selected level 730 (e.g., all computers in the company) or to select "block" 738 to not add this program to the whitelists of all computers associated with the selected level 730 (e.g., all computers in the company).

To review and/or adjust the whitelists (or blacklists), a report administrator interface 740 as in FIG. 16 is used listing a description 742 of each program in the list, a date added 744 for each program in the list, a file hash value 746 for each program in the list, a level 748 for each program in the list, and a type 750 for each program in the list. Note that for each program, there is a "remove' feature 752 that, upon selecting, the associated program will be removed from the list (whitelist or blacklist).

By providing the above noted administrator interfaces or similar administrator interfaces, the administrator (e.g., administrator of the target computer 10, information technology staff, etc.) is provided the ability to make local or global changes to the whitelists and/or blacklists of the target computer 10 or a collection of computers that will allow or block programs having the defined characteristics (e.g., all programs having a certain name, all programs having a certain digital certificate, all programs executing from a specific directory, etc.). As it is known that strict adherence to whitelisting provides a superior level of security, it is desired that using whitelists be palatable by all users. By making whitelisting more convenient and manageable, the users will be more accepting of whitelisting and the users/company will be generally more secure through the protection provided by only allowing execution of programs that are known (e.g., on the whitelist).

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for computer security, the system comprising:
   a target computer;
   computer security system software stored in non-transitory storage of the target computer; the computer security system software running on the target computer;
   a whitelist accessible by the computer security system software, the whitelist containing entries indicative of which programs are allowed to run on the target computer;
   when a program attempts to execute on the target computer, the computer security system software determines whether the program is allowed to run using the whitelist and when the program is allowed to run, the computer security system software running on the computer allows the program to run;
   when the program is prevented from running, data regarding the program is captured and stored;
   after the program is prevented from running, a set of rules accessible by administrative software determines if the program is within a program classification and when the program is within the program classification, the administrative software presents a user interface for an administrator that includes allowing by the program classification, the administrative software then accepts inputs and upon acceptance of the program classification, the administrative software updates the whitelist to add an entry that allows execution of the programs in the program classification; and
   when the program is not within the program classification, the administrative software presents a second user interface for the administrator that request approval solely for the program and the administrative software then accepts the inputs and upon the acceptance of the program, the administrative software updates the whitelist to add the entry for the program;
   otherwise, the whitelist is not updated and future attempts to run the program will be blocked.

2. The system of claim 1, wherein the entry in the whitelist enables the execution of the program based upon a file hash value of the program.

3. The system of claim 1, wherein the entry in the whitelist enables the execution of the program classification based upon a file folder in which the program is stored.

4. The system of claim 1, wherein the entry in the whitelist enables the execution of the program classification based upon a digital signature of the program.

5. The system of claim 1, wherein the entry is made in a local whitelist that is local to the target computer.

6. The system of claim 1, wherein the entry is made in a shared whitelist that is common to all computers in a group of computers.

7. The system of claim 1, wherein the entry is made in a shared whitelist that is common to all computers in a user account.

8. The system of claim 1, wherein the entry is made in a company-wide whitelist that is common to all computers company-wide.

9. A system for computer security, the system comprising:
   a target computer;
   computer security system software stored in non-transitory storage of the target computer; the computer security system software running on the target computer;
   a whitelist accessible by the computer security system software, the whitelist containing entries indicative of which programs are allowed to run on the target computer;
   when a program attempts to execute on the target computer, the computer security system software determines whether the program is allowed to run using the whitelist and when the program is allowed to run, the computer security system software running on the computer allows the program to run;
   when the program is prevented from running, data regarding the program is captured and stored;
   after the program is prevented from running, a set of rules determines if the program is within a program classification and when the program is within the program classification, administrative software presents a user interface for an administrator that includes the program classification, upon receiving an acceptance of the program classification, the administrative software updates the whitelist to add an entry that allows execution of the programs in the program classification;
   otherwise, the administrative software presents a second user interface for the administrator that requests approval solely for the program and upon the acceptance, the administrative software updates the whitelist to add the entry for the program; and
   otherwise, the whitelist is not updated and future attempts to run the program will be blocked.

10. The system of claim 9, wherein the entry in the whitelist is based upon a file hash value of the program.

11. The system of claim 9, wherein the entry in the whitelist is for the program classification of a file folder in which the program is stored.

12. The system of claim 9, wherein the entry in the whitelist is for the program classification of other programs sharing a digital signature of the program.

13. The system of claim 9, wherein the entry applies only to the target computer.

14. The system of claim 9, wherein the entry applies to all computers in a group of computers.

15. The system of claim 9, wherein the entry applies to all computers in a user account.

16. The system of claim 9, wherein the entry applies to all computers company-wide.

17. A method of protecting a target computer, the method comprising:

upon a program attempting to be run on the target computer, determining whether the program is allowed to run based upon an entry in a whitelist and when the program is allowed to run based upon the entry in the whitelist, allowing the program to run on the target computer; otherwise, preventing the program from running and storing data regarding the program;

later, retrieving the data regarding the program and if the data indicates that the program is within a program classification, requesting approval to allow future executions of all programs in the program classification, and upon the approval, adding the entry to the whitelist, thereby enabling the future execution of all programs in the program classification;

otherwise, requesting the approval to allow the future executions of only the program and if allowed, adding the entry in the whitelist, thereby allowing the future execution of the program; and otherwise, not allowing the future executions of the program.

18. The method of claim 17, wherein the entry in the whitelist is for the program classification of all programs that are stored a same file folder as the file folder in which the program is stored.

19. The method of claim 17, wherein the entry in the whitelist is for the program classification of all programs sharing a digital signature with the program.

20. The method of claim 17, wherein the entry applies to all computers associated with a company.

\* \* \* \* \*